(12) United States Patent
Chung

(10) Patent No.: US 7,813,934 B1
(45) Date of Patent: *Oct. 12, 2010

(54) TRACKING APPARATUS AND METHOD, AS FOR AN EXHIBITION

(75) Inventor: Kevin Kwong-Tai Chung, Princeton, NJ (US)

(73) Assignee: Avante International Technology, Inc., Princeton Junction, NJ (US)

(*) Notice: Subject to any disclaimer, the term of this patent is extended or adjusted under 35 U.S.C. 154(b) by 2343 days.

This patent is subject to a terminal disclaimer.

(21) Appl. No.: 10/365,803

(22) Filed: Feb. 13, 2003

Related U.S. Application Data

(63) Continuation-in-part of application No. 09/975,370, filed on Oct. 11, 2001, now Pat. No. 6,657,543, application No. 10/365,803, which is a continuation-in-part of application No. 09/854,722, filed on May 14, 2001, now Pat. No. 6,696,954.

(60) Provisional application No. 60/240,748, filed on Oct. 16, 2000, provisional application No. 60/243,640, filed on Oct. 26, 2000, provisional application No. 60/245,596, filed on Nov. 3, 2000, provisional application No. 60/248,454, filed on Nov. 14, 2000, provisional application No. 60/255,162, filed on Dec. 13, 2000, provisional application No. 60/260,849, filed on Jan. 10, 2001, provisional application No. 60/304,017, filed on Jul. 9, 2001, provisional application No. 60/305,686, filed on Jul. 16, 2001, provisional application No. 60/323,514, filed on Sep. 19, 2001, provisional application No. 60/405,093, filed on Aug. 21, 2002.

(51) Int. Cl.
*G06Q 99/00* (2006.01)
*G08B 13/14* (2006.01)

(52) U.S. Cl. ...................................... 705/1; 340/572.1
(58) Field of Classification Search ....................... 705/1
See application file for complete search history.

(56) References Cited

U.S. PATENT DOCUMENTS 4,636,950 A * 1/1987 Caswell et al. ................. 705/28
4,791,655 A 12/1988 Nagata et al.

(Continued)

FOREIGN PATENT DOCUMENTS

WO 97/48040 12/1997

OTHER PUBLICATIONS

Yacoob, Yaser WO 97/48040.*

(Continued)

*Primary Examiner*—Matthew S Gart
*Assistant Examiner*—Garcia Ade
(74) *Attorney, Agent, or Firm*—Clement A. Berard, Esq.; Dann, Dorfman, Herrell & Skillman, PC

(57) ABSTRACT

Apparatus and method are useful for conducting an exhibition at which visitors visit plural booths and/or stations at which a PDA and an encoded tag reader are provided. Exhibitor information is stored in a memory of the PDA. An encoded tag issued each visitor includes a memory from which information may be transmitted and/or into which information may be stored. Stored information may include visitor information, exhibitor information, visit information, product/service information and/or data items. The PDA and encoded tag reader communicate with the encoded tags and communicate directly or indirectly with one or more processors that process the information, e.g., for providing a report.

28 Claims, 14 Drawing Sheets

U.S. PATENT DOCUMENTS

| | | | |
|---|---|---|---|
| 4,931,788 A | 6/1990 | Creswick | |
| 4,968,873 A | 11/1990 | Dethloff et al. | |
| 5,051,565 A | 9/1991 | Wolfram | |
| 5,221,831 A | 6/1993 | Geiszler | |
| 5,257,011 A | 10/1993 | Beigel | |
| 5,259,025 A | 11/1993 | Monroe et al. | |
| 5,272,318 A | 12/1993 | Gorman | |
| 5,291,411 A | 3/1994 | Bianco | |
| 5,396,218 A | 3/1995 | Olah | |
| 5,401,944 A | 3/1995 | Bravman et al. | |
| 5,412,727 A | 5/1995 | Drexler et al. | |
| 5,465,082 A | 11/1995 | Chaco | |
| 5,566,327 A | 10/1996 | Sehr | |
| 5,627,517 A | 5/1997 | Theimer et al. | |
| 5,650,768 A | 7/1997 | Eswaran | |
| 5,661,470 A | 8/1997 | Karr | |
| 5,675,628 A | 10/1997 | Hokkanen | |
| 5,682,142 A | 10/1997 | Loosmore et al. | |
| 5,732,401 A | 3/1998 | Conway | |
| 5,845,264 A | 12/1998 | Nellhaus | |
| 5,875,434 A * | 2/1999 | Matsuoka et al. | 705/28 |
| 5,886,634 A | 3/1999 | Muhme | |
| 5,887,176 A * | 3/1999 | Griffith et al. | 713/320 |
| 5,914,671 A | 6/1999 | Tuttle | |
| 5,917,174 A | 6/1999 | Moore et al. | |
| 5,936,527 A | 8/1999 | Isaacman et al. | |
| 5,963,136 A | 10/1999 | O'Brien | |
| 5,971,279 A | 10/1999 | Raistrick et al. | |
| 5,979,941 A | 11/1999 | Mosher et al. | |
| 6,002,344 A | 12/1999 | Bandy et al. | |
| 6,077,106 A | 6/2000 | Mish | |
| 6,078,928 A | 6/2000 | Schnase et al. | |
| 6,100,804 A | 8/2000 | Brady et al. | |
| 6,111,506 A | 8/2000 | Yap et al. | |
| 6,112,240 A | 8/2000 | Pogue et al. | |
| 6,139,495 A | 10/2000 | De La Huerga | |
| 6,150,942 A | 11/2000 | O'Brien | |
| 6,222,452 B1 * | 4/2001 | Ahlstrom et al. | 340/572.1 |
| 6,232,877 B1 | 5/2001 | Ashwin | |
| 6,255,951 B1 | 7/2001 | De La Huerga | |
| 6,285,342 B1 | 9/2001 | Brady et al. | |
| 6,287,765 B1 | 9/2001 | Cubicciotti | |
| 6,294,997 B1 * | 9/2001 | Paratore et al. | 340/572.1 |
| 6,294,999 B1 | 9/2001 | Yarin et al. | |
| 6,366,777 B1 | 4/2002 | Uusitalo | |
| 6,397,190 B1 | 5/2002 | Goetz | |
| 6,418,372 B1 | 7/2002 | Hofmann | |
| 6,421,013 B1 | 7/2002 | Chung | |
| 6,427,073 B1 | 7/2002 | Kortesalmi et al. | |
| 6,427,913 B1 * | 8/2002 | Maloney | 235/383 |
| 6,466,970 B1 * | 10/2002 | Lee et al. | 709/217 |
| 6,512,478 B1 * | 1/2003 | Chien | 342/357.09 |
| 6,574,166 B2 | 6/2003 | Niemiec | |
| 6,657,543 B1 * | 12/2003 | Chung | 340/573.1 |
| 6,671,563 B1 | 12/2003 | Engelson et al. | |
| 6,696,954 B2 * | 2/2004 | Chung | 340/572.7 |
| 6,720,865 B1 | 4/2004 | Forster et al. | |
| 6,883,710 B2 | 4/2005 | Chung | |
| 6,912,398 B1 * | 6/2005 | Domnitz | 455/461 |
| 6,961,000 B2 | 11/2005 | Chung | |
| 7,098,793 B2 | 8/2006 | Chung | |
| 7,158,030 B2 | 1/2007 | Chung | |
| 2001/0028308 A1 | 10/2001 | De La Huerga | |
| 2002/0016739 A1 | 2/2002 | Ogasawara | |
| 2003/0216968 A1 * | 11/2003 | Barnhart | 705/14 |
| 2006/0173781 A1 * | 8/2006 | Donner | 705/50 |
| 2006/0192003 A1 | 8/2006 | Chung | |
| 2007/0136154 A1 | 6/2007 | Chung | |

OTHER PUBLICATIONS

Frontline Solutions, "RFID Standards Buoy Packaging", Jul. 2001, 3-Pages.

Frontline Solutions, "Packagers Think Outside the Box", May 2001, 3-Pages.

Frontline Solutions, "RFID Baggage Tracking Solution Helps Keep SFIA Secure", Jul. 2001, 4-Pages.

Frontline Solutions, "Standard Response", Jul. 2001, 1-Page.

Avante International Technology, Inc., "How Does Leads-Trakker Work to Enhance the Values for Exhibitors and Visitors?", 2002, 3-Pages.

Leads-Trakker Web Pages, http:/www.leads-trakker.com/ Printed Nov. 18, 2002, 18-Pages.

Internet Archive Wayback Machine, www.trakkers.com, search and archive pages for May 10, 2000, Sep. 22, 2001 and Feb. 4, 2002, 8 Pages.

Trakker Technologies, Inc., www.trakkers.com, www.trakkers.com/products.html, www.trakkers.com/productshow.html, May 18, 2004, 9 Pages.

Avante International Technology, Inc., Website www.leadretrievalsystem.com, Printed Jun. 22, 2004, 12 Pages.

European Patent Office, "Supplementary European Report—Application No. EP 018414", Jun. 9, 2009, 2 pages.

\* cited by examiner

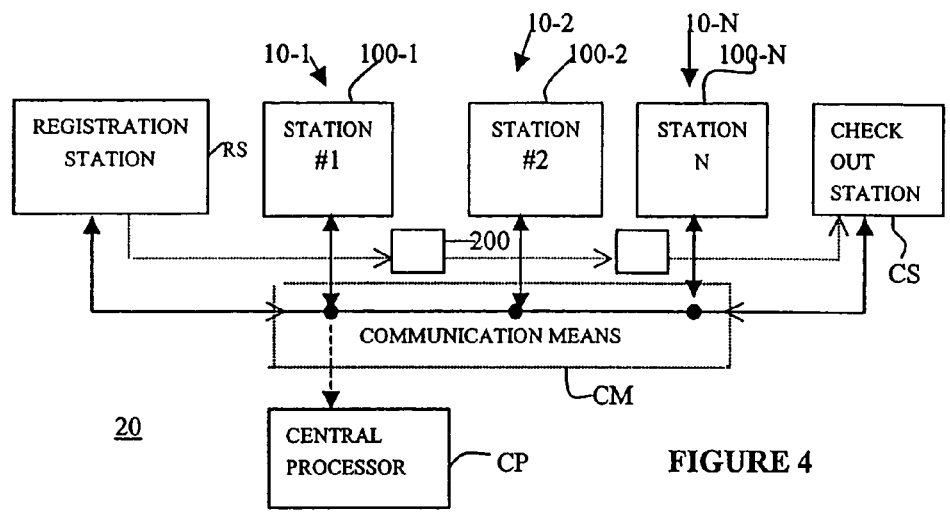
FIGURE 4
FIGURE 7A
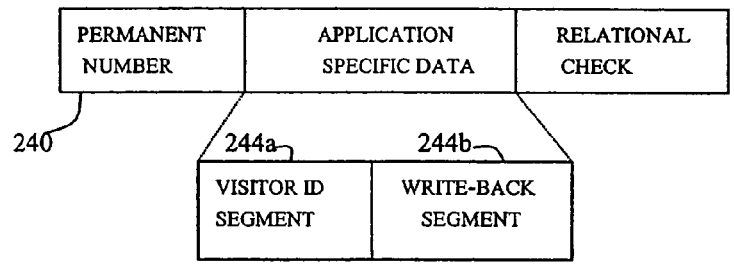
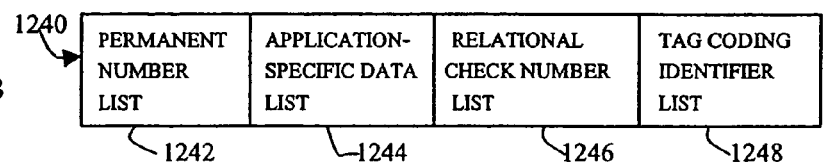
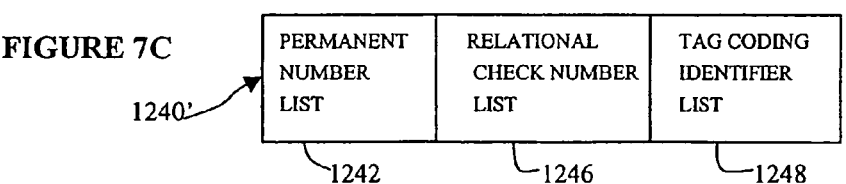

TRACKING APPARATUS AND METHOD, AS FOR AN EXHIBITION

This application is a continuation-in-part of U.S. patent application Ser. No. 09/975,370 filed Oct. 11, 2001, now U.S. Pat. No. 6,657,543 issued Dec. 2, 2003, which claims the benefit of:

U.S. Provisional Application Ser. No. 60/240,748 filed Oct. 16, 2000,

U.S. Provisional Application Ser. No. 60/243,640 filed Oct. 26, 2000,

U.S. Provisional Application Ser. No. 60/245,596 filed Nov. 3, 2000,

U.S. Provisional Application Ser. No. 60/248,454 filed Nov. 14, 2000,

U.S. Provisional Application Ser. No. 60/255,162 filed Dec. 13, 2000,

U.S. Provisional Application Ser. No. 60/260,849 filed Jan. 10, 2001,

U.S. Provisional Application Ser. No. 60/304,017 filed Jul. 9, 2001,

U.S. Provisional Application Ser. No. 60/305,686 filed Jul. 16, 2001,

U.S. Provisional Application Ser. No. 60/323,514 filed Sep. 19, 2001, and of U.S. patent application Ser. No. 09/854,722 filed May 14, 2001, now U.S. Pat. No. 6,696,954 issued Feb. 24, 2004.

This Application further claims the benefit of:

U.S. Provisional Application No. 60/405,093 filed Aug. 21, 2002.

The present invention relates to a tracking arrangement and, in particular, to a tracking apparatus and method useful in various environments.

In a exhibition, convention, trade show, product show or similar environment (usually referred to as an exhibition"), many visitors may visit any number of displays, exhibits, booths, shows, product areas, lectures, seminars, and the like (usually referred to as "booths" or "stations"). At each place visited the visitor may collect, order and/or request literature, catalogs, sales brochures, data sheets, samples, models, products, additional information, and the like. In addition, each sales person, manufacturer, operator, exhibitor or other proprietor of a booth or display (usually referred to as "exhibitors") desires to meet its customers, potential customers and other interested persons (usually referred to as "visitors") face-to-face and discuss their respective interests, products and applications and the like.

The visitors desire to receive the information, samples and the like requested at each booth and the exhibitors desire to have a record of the visitors, their requests and interests. These desires were addressed by paper forms or informal notes, or by the exchange of business cards. Such paper records tended to be cumbersome to use and error prone, and often took a considerable time to process or were often misplaced or lost. They also involved much manual work.

Issuing to each visitor pre-printed mailing labels or an embossed plastic card from which imprints could be made mechanically provided some degree of uniformity, but the paper records therefrom were also subject to delay and loss. The desire to maintain a complete, accurate and up to date record of the visitors and requests was addressed by automated or automatic methods of providing such record. However, conventional methods, even some of the more automated methods, all have shortcomings that result in less than the desired record being provided.

More sophisticated automatic methods employed bar-coded labels and/or magnetic stripe cards, each with suitable readers. While the cost of such labels and cards is low, so is the information that can be embedded or coded in either of these media. In addition, most readers are read-only devices and cannot store any additional information in the bar-code label or magnetic stripe card. Moreover, the lack of memory capacity in the media tends to make the readers more complex and more expensive, and the information that could be printed out is consequently limited.

Moreover, both bar-code and magnetic stripe media require a "line-of-sight" or direct communication path between media and reader, and the reliability of correct reading is about 80-90%, as anyone who has gone through a store check-out bar-code reader or used a magnetic stripe credit card reader will recognize. Repeated passes of the bar-code label in front of the bar-code reader and repeated swipes of the credit card through the card reader create delay and annoyance, and can produce record errors. Both are very inconvenient when inserted into a plastic badge holder that is clipped or pinned to the visitor, because the bar-code label or magnetic stripe card must either be repeatedly removed from and re-inserted into the badge holder and/or the bar-code reading error rate greatly increases due to the badge holder.

Electronic tracking using radio frequency identification (RFID) tags is one way to overcome the disadvantages of the prior art bar-code and magnetic stripe approaches. Prior art systems typically do not track visitors along the path of their visit and/or do not have reliable, essentially 100% correct reader performance, essentially without the need for human intervention, as is desirable for providing complete and accurate records.

Accordingly, there is a need for a tracking system that can track visitors to various exhibit stations, and that can facilitate quickly and accurately providing requested information to visitors and/or exhibitors. It would also be desirable, but is not necessary, that such system not require line-of-sight readers.

To this end, the method of the present invention for conducting an exhibition wherein a visitor having an encoded tag visits a plurality of stations each including an encoded tag reader, the method comprises:

registering a visitor including storing in a database visitor information entered on a registration screen accessed via the Internet;

issuing a visitor tag containing visitor information, the visitor tag providing at least visitor information in an encoded tag format;

registering exhibitors including storing in a database exhibitor information entered on a registration screen accessed via the Internet;

storing exhibitor information of a registered exhibitor in a memory of one of a number of respective PDA devices, wherein each respective PDA device has an encoded tag reader associated therewith for receiving information in the encoded tag format;

whereby information can be communicated between the visitor tag and the PDA device when the visitor tag is proximate the PDA device such as at one of the plurality of stations, providing the respective PDA devices, wherein each PDA device includes stored exhibitor information of a respective registered exhibitor;

communicating information between the visitor tag and a particular PDA device when the visitor tag is proximate the particular PDA device, wherein visitor information from the visitor tag is stored in a memory associated with the particular PDA device and/or wherein exhibitor information from the particular PDA device is stored in a memory associated with the visitor tag;

collecting visitor information and exhibitor information from ones of the respective PDA devices and/or visitor tags after one or more visitor tags have communicated with a respective station;

processing the visitor information and exhibitor information collected from ones of the respective PDA devices and/or visitor tags in relation to visitor information and/or exhibitor information stored in the database; and providing a report including processed exhibitor information representative of stations that communicated with a visitor tag and/or providing a report including processed visitor information representative of visitor tags that communicated with a respective station.

According to another aspect of the invention, a system for reading and/or writing to an encoded tag comprises a PDA device including a touch screen for displaying and for entering information, a memory for storing information and a processor operatively coupled to the touch screen for displaying information thereon and for receiving information entered thereon and to the memory for storing information therein and for receiving information stored therein. An encoded tag reader provides and/or receives information-bearing signals in an encoded tag format, and includes a sensor operatively coupled to the encoded tag reader for transmitting and/or receiving the information in an encoded tag format. Means couple the PDA device and the encoded tag reader, wherein the processor is operatively coupled to the encoded tag reader for processing information represented in the information received from an encoded tag via the sensor and for causing the encoded tag reader to transmit information to the encoded tag via the sensor, and wherein the processor of the PDA device causes information represented in the information received from an encoded tag via the sensor and encoded tag reader to be displayed on the touch screen and to be stored in the memory of the PDA device.

BRIEF DESCRIPTION OF THE DRAWING

The detailed description of the preferred embodiments of the present invention will be more easily and better understood when read in conjunction with the FIGURES of the Drawing which include:

FIG. 4 is a schematic block diagram also illustrating an example embodiment of a tracking system;

FIGS. 7A, 7B and 7C are schematic representations of memory allocations and relational data base arrangements suitable for use with the described embodiments;

Figure 1:
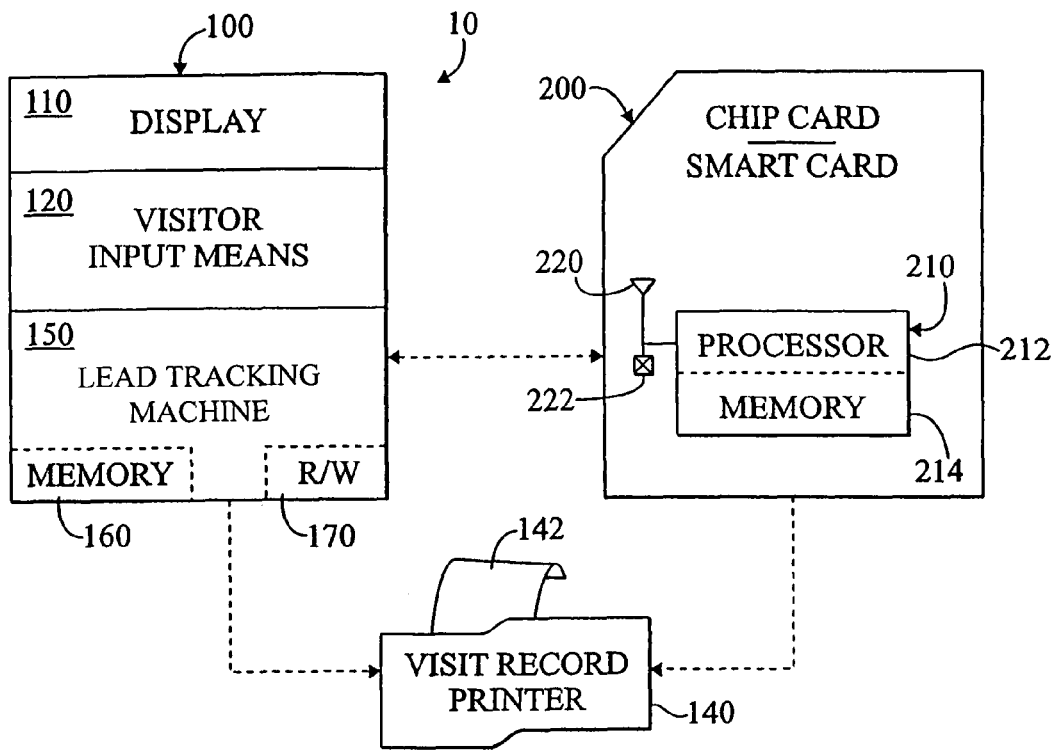
FIG. 1 is a schematic block diagram illustrating an example embodiment of a tracking system.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similar elements may be shown in the same figure designated by different "dash numbers" such as X-1, X-2, and so on. It is noted that, according to common practice, the various features of the drawing are not to scale, and the dimensions of the various features are arbitrarily expanded or reduced for clarity.

DESCRIPTION OF THE PREFERRED EMBODIMENT

A system is useful for identifying a visitor at or to a plurality of booths or stations. A smart tag is issued to or associated with each visitor, for example, by being attached to a badge or carried in a pocket or purse, and is detected or read at each booth or station. The smart tag includes at least an electronic memory coupled to an antenna by which information from the memory may be transmitted and/or information may be received and stored in the memory. Information stored in the smart tag memory may include or relate to, for example, the visitor's identification, interests and/or requested data items.

Smart tag control units (e.g., readers and/or writers) and antenna arrays at the booths or stations communicate with the smart tags and may communicate directly or indirectly with one or more processors that process the information. Smart tag control units and antenna arrays at one or more exits or check out stations communicate with the smart tags and communicate directly or indirectly with one or more processors that process the information, and may provide a record of the visitor's visit to the exhibition to the visitor and/or exhibitors, and/or may initiate the providing of data items.

As used herein, the following terms are used to include but are not limited to:

"Booth" and/or "station" are used to refer to any booth, station, exhibit, display, product area, seminar, lecture, demonstration, show, performance, and the like that one or more visitors may visit at an exhibition.

"Exhibition" is used to refer to any exhibition, group or collection of exhibits or displays, convention, trade show, product show, conference, seminar, museum, or similar environment in which information, education, products, services and/or anything else of interest to visitors is exhibited, displayed, presented or otherwise made available at a plurality of booths or stations, usually by plural exhibitors or presenters.

"Exhibitor" is used to refer to each sales person, manufacturer, operator, exhibitor, lecturer, presenter, performer, or a proprietor of a booth or station.

"Data item" is used to refer to each and all literature, catalog, sales brochure, data sheet, sample, model, product, additional information, and the like that a visitor may request, order, pick up or otherwise collect ant any exhibit and/or exhibition.

"Electronic gate" is used to refer to an array of antenna in combination with a smart tag reader/writer that communicates with a smart tag via the antenna array, and which may also include a display, annunciator or other device for providing information in human perceivable form. The antenna array may be disposed at an entry point or other location of a booth or exhibit for receiving information produced from a smart tag that is within its detection region and for transmitting information to be stored in the memory of a smart tag within its detection region.

"Smart tag" is used to refer to an article that includes at least an electronic memory wherein information from the memory may be transmitted and/or information may be received and stored in the memory. A "wireless" type smart tag including an antenna is preferred, wherein the information is electromagnetically coupled from or to the antenna over a distance or range. However, a "contact" type smart tag, wherein the information is electrically coupled through physical electrical connections made to contacts on the smart tag, may also be utilized, although it is less convenient. "Encoded tag" includes smart tags and other articles having machine-readable information encoded therein. Such encoded articles may be in the form of a tag, card, label and/or other desired form.

"Visitor" is used to refer to customer(s), potential customer(s), client(s), potential client(s), colleague(s), participant(s), and/or any other interested person(s) and/or audience at or to an exhibit and/or exhibition.

The system and method may be utilized, for example, to facilitate an exhibitor's desire to distribute data items relating to its products and/or services, to meet a visitor face-to-face and discuss their respective interests, products and applications and the like, and to provide data items that are or might be of interest, and any other interest, as well as the independent, mutual and/or reciprocal interests of visitors.

FIG. 1 is a schematic block diagram illustrating an example embodiment of a tracking system. Electronic gate 100, also referred to as a lead tracking machine or gate, is located at a booth or station 10. Electronic gate 100 preferably includes a display 110, visitor data input means 120 and a processor 150 which includes a reader and/or writer for communicating with a smart tag 200. Display 110 typically includes a visual display device such as a video or computer monitor, LCD display, cathode ray tube, dot-matrix display, touch screen display, or any other display providing information in a visual form that can be perceived (e.g., seen) by a person. Display 110 may also include an annunciator, loudspeaker, or other sound transducer for providing audible information that can be perceived (e.g., heard) by a person. Visitor input means 120 typically includes a keypad, keyboard, touch pad, light pen, or other device by which a visitor may enter information into lead tracking electronic gate/machine 100.

Processor 150 includes a sensor or encoded tag reader 170 for at least receiving and decoding information from an encoded tag 200 that is within its detection region. Preferably, tag reader 170 receives information transmitted by a smart tag 200 via an antenna or array of antenna, i.e. when smart tag 200 is within a space in which electromagnetic radiation from its antenna 220 is effective to be received by an antenna array of the smart tag reader. In addition, and preferably, the smart tag reader is a smart tag reader/writer that also encodes and transmits information electromagnetically via its antenna array effective to be received by antenna 220 of smart tag 200 when in the detection region. Such smart tag readers and reader/writer 170 may be of any suitable type including commercially available conventional reader/writers.

Decoded information received from smart tag 200 is displayed by display 110, typically as a greeting to a visitor that may be personalized by including all or part of the information read from the visitor's smart tag 200 in the greeting. The greeting may be visual or audible or both. The visitor (or the exhibitor or other person) may enter information requests and the like, i.e. requests for data items, via input means 120 which information is stored in a memory 160 associated with processor 150 or is transmitted to smart tag 200 via reader writer 170. In either case, information from smart tag 200 and information entered via input means 120 are related and stored in a memory, and typically provide a record of a visitor's visit to booth or station 10. The memory in which such visit record information is stored may be memory 214 of smart tag 200, or may be memory 160 of lead tracking machine 150, or both.

Smart tag 200 includes an electronic device 210 and an electrical device such as antenna 220 and/or electrical contacts 222 by which information is provided and/or received. Electronic device 210 typically includes an electronic memory 214 in which information is stored and a processor 212. Processor 212 retrieves and codes information produced from memory 214 in a form suitable for communication via antenna 220 and/or electrical contacts 222. Preferably, processor 210 also codes and provides information received via antenna 220 and/or electrical contacts 222 and stores such information in memory 214.

The coding provided by processor 210 may include modulating and demodulating signals for radio frequency communication and/or converting information to suitable digital and/or analog signal format for communication via antenna 220 and/or contacts 222, and may also include converting received information to a form, typical a digital format, for storage in memory 214. Processor 210 may also perform signal synchronization, authorization verification and/or encryption/decryption as may be deemed necessary and/or convenient.

Information including related information from smart tag 200 and from electronic gate 100, e.g., typically information that is a record of a visit to a booth or station 10 or to plural booths or stations 10, may be provided in tangible form, such as being printed on a paper 142 by a printer 140. Such information may be produced from memory 140 of processor 150 or from memory 214 of smart tag 200, or both. Printer 140 may be a printer to paper, or may be an electronic writing device that provides the information on other tangible media, such as floppy disks, CDs and other electronic media. Printer or other media writer 140 may be associated with a particular station 10 or electronic gate 100, or may be associated with a check-out station remote from station 10. Where printer 140 is remote from station 10, information is communicated thereto by conventional communication means including but not limited to wire, cable, optical fiber, local area network (LAN), wide area network (WAN), radio transmission, optical transmission or other suitable means, or any combination thereof, with or without one or more communication hubs.

Figure 2:
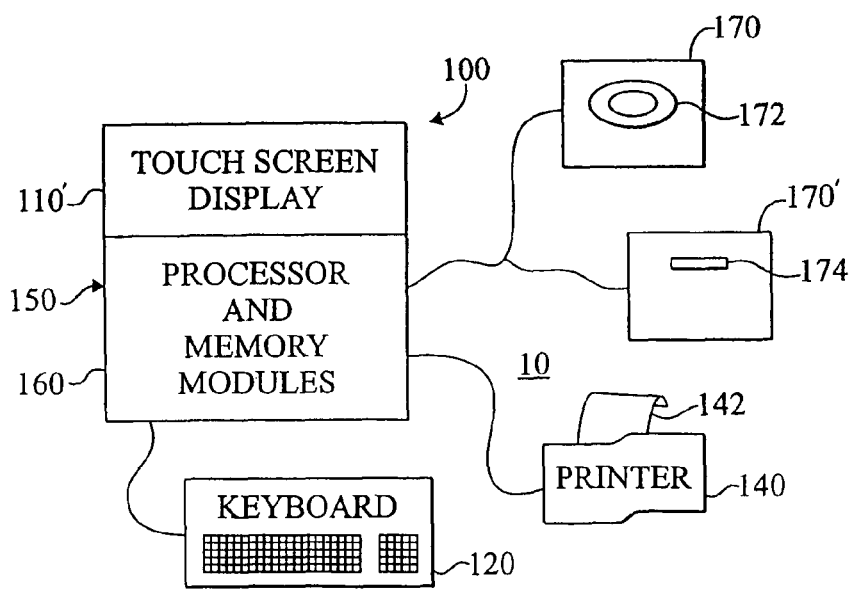
FIGS. 2, 3A and 3B are schematic diagrams illustrating example embodiments of a station of the tracking system.

FIG. 2 is a schematic block diagram illustrating an example embodiment of a station 10 of the tracking system. Electronic gate or lead tracking machine or gate 100 therein shows further detail of the embodiment of FIG. 1. Touch screen display 110' provides an easy to use and convenient combined display and input means through which a greeting or other message may be provided to a visitor and information and requests may be received from the visitor. Keyboard 120, which may be optional in this embodiment, such as a standard computer keyboard, provides an alternative input means through which the visitor and/or exhibitor (or other person) may enter information into processor 150.

Smart tag reader writer 170 is illustrated as a reader/writer for wireless smart tags 200 and so includes an antenna or antenna array 172, which is preferable. Alternatively or additionally, smart tag reader writer 170' is illustrated as a reader/writer for contact-type smart tags 200 and so includes slot 144 into which a smart tag 200 is inserted to be read or written to. Reader/writer 170, 170' may include a collection or "take-in" mechanism for collecting smart tags when that reader/writer is utilized where smart tags are to be collected. Printer 140 or another media writing device is directly associated with electronic gate 100 of FIG. 2.

Figure 3A:
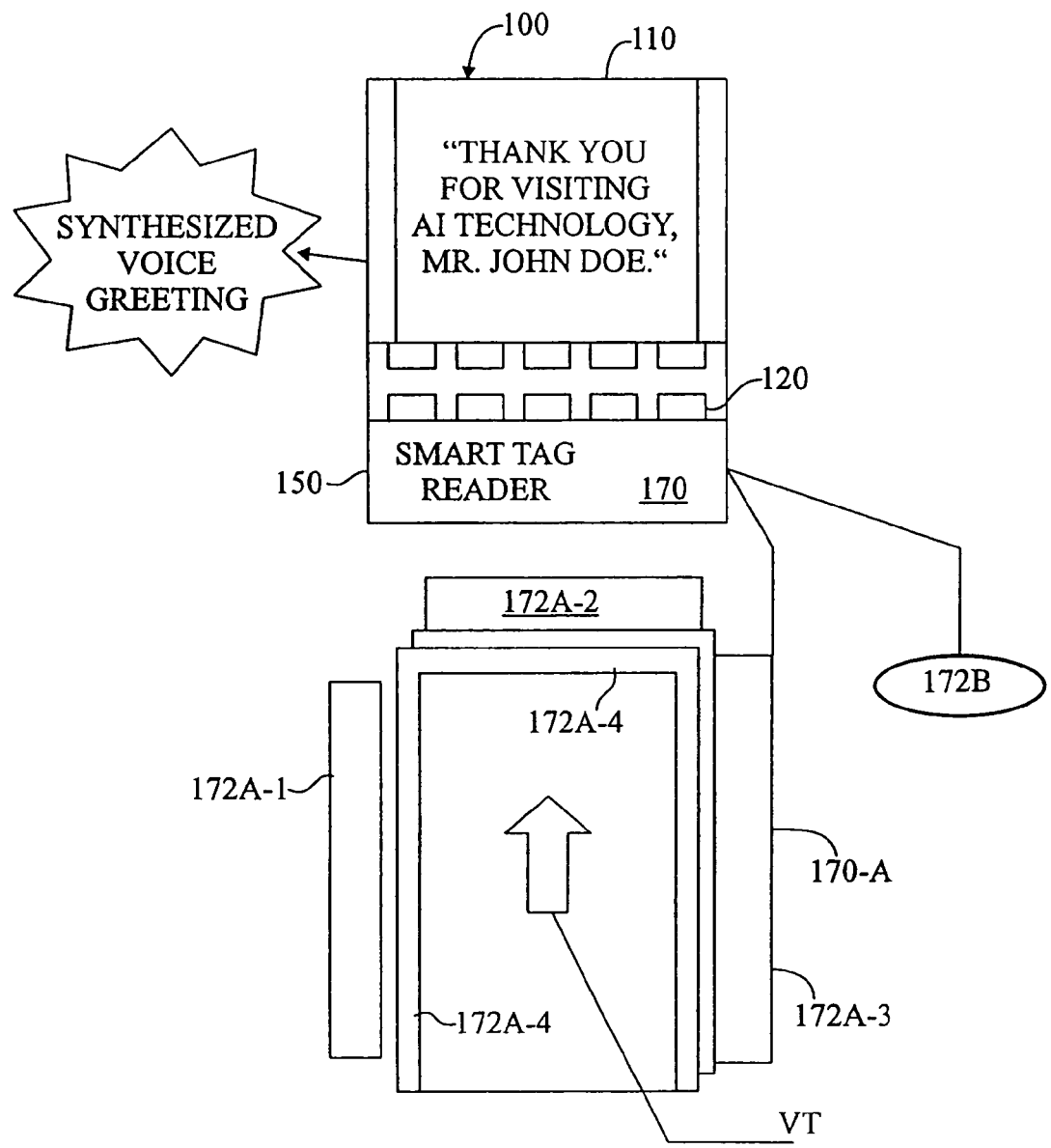

FIG. 3A is a schematic diagram illustrating an example of a station 10. Electronic gate 100 may be included in a "kiosk" type arrangement in which display 110, keyboard 120 and smart tag reader 170 are contained in a common housing. As illustrated by the "star-burst" to the left of gate 100, display 110 provides an audible greeting wherein speech is synthesized by processor 150 in response to information read from the visitor's smart tag 200. Speech or voice synthesizers are available from many commercial sources and in many languages. The visitor's language preference may be obtained at registration and stored in his smart tag badge and then read from the smart tag to produce the audible greeting in the visitor's language.

Also as illustrated, processor 150 processes information from smart tag 200 and information entered at electronic gate 100 to provide a visual greeting. For example, the visitor's name "John Doe" read from smart tag 200 is combined with the name of the company "AI Technology" utilizing gate 100, which is entered via keyboard 120. Processor 150 combines those names with a script, which may also have been entered by the company via keyboard 120, to produce the greeting, "Thank you for visiting AI Technology, Mr. John Doe."

Electronic gate 100 may employ various antenna for communicating electromagnetically with smart tag 200. For example, an array of antenna 172A are disposed about an entranceway 174 and may include antenna on the sides and top thereof and/or surrounding the opening through which a visitor VT passes. Antennas 172A-1 through 172A-4 of antenna array 172A are represented by rectangles and visitor VT is represented by a large arrow. Preferably, antenna array 172A is arranged for detecting smart tags 200 within entranceway 174 with close to 100% reading rate irrespective of the orientation of smart tag 200. Alternatively, gate 100 may employ a simple loop antenna 172B preferably positioned for reliably reading smart tags 200 in a preferential orientation, such as clipped to the front of a visitor.

Each station 10 includes a control unit for communicating with smart tags when the smart tag is within the detection region of the control unit and its associated antenna array 172. Each antenna array 172 typically includes a plurality of antenna, typically loop antenna, arranged so that a smart tag within the detection region will be detected with substantially 100% reliability. The antenna array typically produces and/or is responsive to electromagnetic fields having a component in each of three orthogonal directions, or at least in directions coupling with the antenna of the smart tag in any orientation it may be in when in the detection region.

Each electronic gate 100 has or is assigned an identification number that is associated with the exhibitor of that station 10 (exhibitor identification number) in a relational data base of the processor 150 (or a local or central processor LP, CP), and which enables access to exhibitor information such as name, address, telephone and facsimile numbers, e-mail and web site addresses, business and produce/service summaries and the like. In addition, the exhibitor may associate electronic versions of its catalogs, data sheets, literature and other materials with its exhibitor number so that such materials may be retrieved electronically as needed at an exhibition, e.g., at a station 10 or at check out) by using the exhibitor number to associate the relevant materials via the relational database.

In the arrangement of FIG. 3A, a printer 140 may be associated with the electronic gate 100 at station 10, although other printers or other devices providing a tangible record 142 of a visitor's visits could be associated with the station 100 and/or other stations 10 in a tracking system.

Figure 3B:
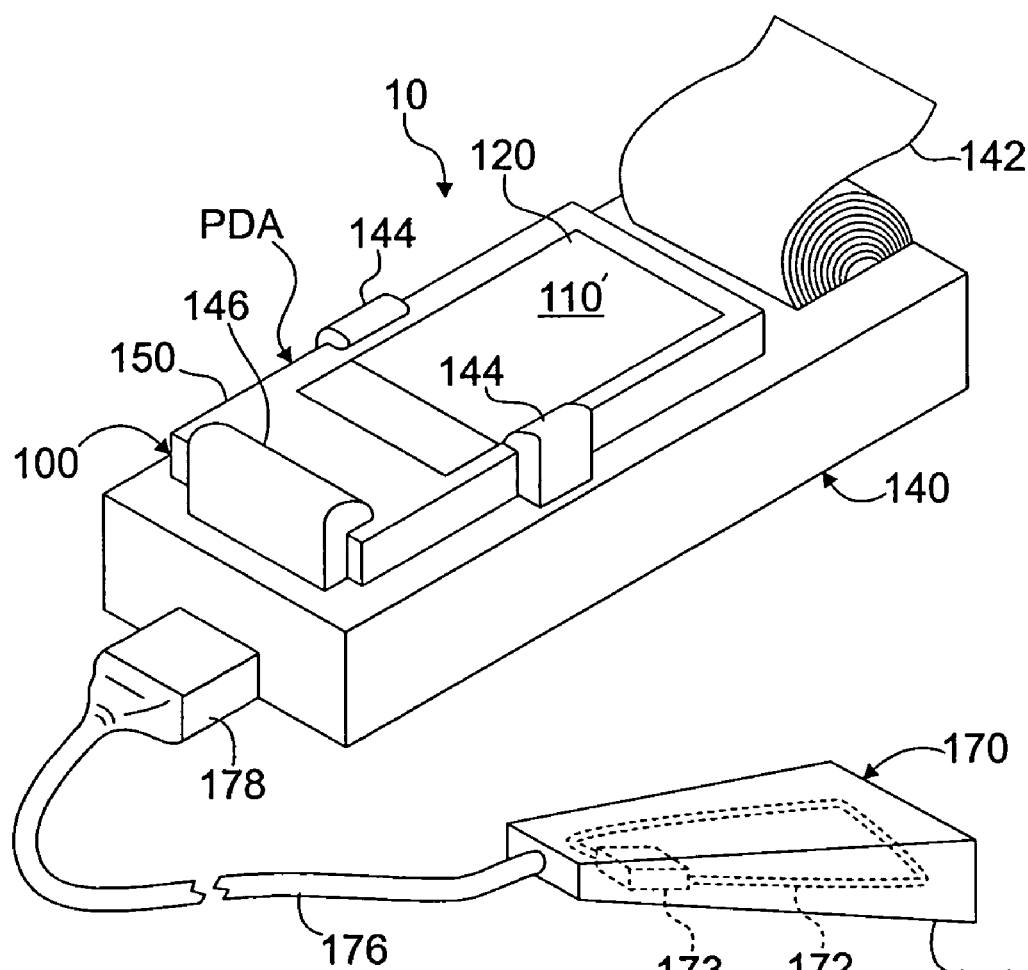

FIG. 3B is a schematic diagram illustrating an example embodiment of a station 10 of the tracking system. Station 10 is an example embodiment that is portable and so is easily transported to and from an exhibition or other event, and which is easily utilized in a booth or other form of station 10. Lead tracking machine 100 thereof includes the elements and function described, for example, in relation to FIGS. 1 and 2 above.

Processor 150 is embodied in a hand-held computing device, such as a personal digital assistant (PDA) or laptop computer or the like. Device PDA includes a touch screen 110' that provides a display as well as a means 120 for entry of information or data, i.e. a data entry device 120. Device PDA is operatively coupled, e.g., electrically coupled, to a printer 140 for providing a printed receipt 142 of information processed by processor 150 of the PDA. In a typical instance, the PDA and printer 140 are arranged so that the PDA "docks" (i.e. mounts) onto printer 140 in a standardized way. For example, printer 140 as illustrated has grips 144 and 146 extending from a surface thereof for holding the PDA in a "docked" position on printer 140. One of the grips, e.g., grip 146, may include electrical contacts disposed to electrically contact corresponding contacts on the PDA, e.g., for communicating electrical signals such as data and power signals therebetween when the PDA is "docked" to printer 140. Alternatively, the coupling between device PDA and printer 140 may be by wireless, RF, infrared, optical or other means of communication. Alternatively, the docking means may include a slot, strap, port, recess, cradle and/or any other arrangement for holding the PDA device and printer in a desired positional relationship.

Sensor or encoded tag/badge reader 170 is disposed in a wand or other hand-holdable housing 171. Sensor or tag reader 170 is coupled to processor 150 via electrical cable 176 and connector 178 that plugs into a corresponding electrical connector of printer 140 to connect therethrough, e.g., via connections in one of docking grips 144, 146, to the PDA including processor 150. Preferably, sensor 170 is a smart tag reader/writer 170 that includes in housing 171 an antenna 172 and a tag reader circuit 173. Typically, antenna 172 comprises several turns (loops) of wire connected at its ends to circuit 173 which is disposed on a printed circuit wiring board made in a conventional manner. Sensor 170 communicates, e.g., with smart tags of the wireless type that are brought within its detection range, typically several centimeters.

It is noted that smart tag reader 170 may be a smart tag reader 170, i.e. apparatus that receives information from a smart tag and/or badge, or may be a smart tag reader/writer 170, i.e. apparatus that receives information from a smart tag and/or badge and transmits information to a smart tag and/or badge. In both cases, smart tag reader 170 and/or reader/writer 170 communicates with a smart tag, e.g., via an antenna that is within range for wireless communication with a wireless smart tag and/or via contacts for communication with a contact-type smart card.

When an exhibitor registers as is described below, the exhibitor information provided is loaded into the memory of a PDA, e.g., prior to the exhibition in the case of an exhibitor who registers in advance, or at the exhibition in the case of an exhibitor who registers at the exhibition. Typically, a station 10 with exhibitor information stored therein (i.e. in the memory of the PDA) including the PDA, optional printer 140 and smart tag reader 170 is provided to the exhibitor for use during the exhibition and is retrieved at the end of its use for the exhibition.

When a smart tag or smart badge (e.g., a badge including smart tag elements) is brought near to tag reader 170, reader 170 reads the information stored in the memory of the smart tag/badge, e.g., visitor information, and communicates same to processor 150 of the PDA. Processor 150 processes the visitor information and may cause that information and/or information derived therefrom to be displayed on touch screen 110' and/or to be printed on a tangible medium such as paper record 142 by printer 140. Among the information displayed on screen 110' may be the name and business affiliation of the person to whom the smart tag/badge was issued, thereby providing a greeting or welcome message, e.g., visually and/or audibly via synthesized speech, either to the visitor and/or to a person utilizing the lead tracking machine 100. Such visual and/or audible greeting is also helpful to salespersons and/or other personnel working at the booth or station 10 for having personal interaction with the visitor.

In addition, information about the exhibitor from processor 150 may be displayed on screen 110' as informative information and/or as one or more questions eliciting information and/or interests from a visitor. Information input to the PDA via the data entry 120 aspect of touch screen 110', for example, by the visitor and/or by station 10 personnel, is processed by processor 150 and may be stored in the memory thereof and/or may be communicated via reader 170 (which is a smart tag reader and writer 170) to the smart tag/badge.

In any event, station 10 may be utilized in a manner wherein data/information provided by a smart tag/badge is stored in the memory associated with processor 150 of the PDA, wherein data/information provided by processor 150 of the PDA is stored in the memory associated with a smart tag/badge, or both, as is the case regarding other embodiments described herein. Data/information provided by processor 150 may be provided from the memory associated with the processor (e.g., exhibitor information), may be provided via data entry aspect 120 of touch screen 110' of the PDA and/or may be processed by processor 150. Further, such data/information may be stored in the memory associated with the PDA processor 150 and/or in the memory associated with a smart tag/badge. Station 10 reads information provided by a smart tag/badge, however, it is not necessary that any station 10 write information to the smart tag memory (at registration, visitor information is stored in the smart tag/badge as well as in a registration database as described herein). In a present preferred embodiment of the machine 100 of FIG. 3B, for example, visitor information is read from the smart tags, but no information is written thereto at exhibitor stations 10.

Thus, at the end of the use of a station 10 for an exhibition, there is stored in the memory thereof (e.g., the memory associated with processor 150 of the PDA), visitor information for each visitor whose smart tag/badge was read by reader 170 and information, if any, entered via the data entry aspect 120 of touch screen 110' of the PDA, in addition to the exhibitor information stored therein prior to and/or at the exhibition. All this stored information may be read out, e.g., at a time or times during and/or after an exhibition, and processed utilizing a relational database for providing reports to exhibitors, to visitors, to the exhibition sponsor(s) and/or manager(s), and the like, via a tangible medium and/or an electronic or other medium, and/or via e-mail and/or the Internet, as is described herein.

In a preferred embodiment, PDA 150 may be a Visor Pro model PDA which runs the Palm OS (operating system), has 16 megabytes of memory and is available from Handspring, Inc. located in Mountain View, Calif., although other hand-held computing and/or PDA devices, such as those available from Palm Computer, Compaq Computer, Dell computer, Sharp of Japan, Toshiba of Japan, and other companies, could be employed. Therein, printer 140 may be a model PP-50 thermal printer which is manufactured by Datecs Ltd. of Sophia, Bulgaria, is available from Infinite Peripherals, Inc. located in Arlington Heights, Ill., and includes a dock that accepts the Visor Pro PDA device. Reader 170 communicates with smart tags of the sorts described herein, preferably at a frequency of 13.56 MHZ.

While the device including the touch screen 110' and processor 150 is referred to as a PDA which initials generally indicate a "personal digital assistant" device, any suitable hand-held computing device, personal organizer, pocket PC, tablet PC, hand-held computer, laptop computer or the like, may be employed. Such devices may utilize an operating system intended for hand-held devices, such as the Palm OS operating system or the Windows CE operating system, they may utilize other operating systems including but not limited to a Palm operating system, a Windows operating system, a MAC-OS operating system or any other suitable operating system.

FIG. 4 is a schematic block diagram also illustrating an example embodiment of a tracking system 20 including a plurality of stations 10-1 through 10-N, as described above. Registration station RS is for receiving information relating to each visitor, whether by advance registration or on-site registration, and coding that information into the memory of a smart tag 200 that is issued to each visitor, typically as part of an identification badge displaying the visitor's name and affiliation in human readable form. Visitor advance registration may be by mail-in forms or via the Internet by visiting a web site to register for the exhibition. On site registration may include reading of completed forms, such as by optical character readers, or by keyboard entry of visitor information.

As the visitor moves through the exhibition past the various stations 10-1 through 10-N thereof, his identification badge smart tag 200 is read at each station visited by the respective electronic gate or lead tracking machine or gate 100 thereat. The information so read from the visitor's smart tag 200 may be stored in a memory of the electronic gate 100 and/or may be communicated to a central computer or processor CP via any suitable communication link. Information relating to the visitor's visit to each station, such as by responding to queries by pushing buttons or entering data via a keyboard or other data input device, is also either stored in the electronic gate 100 or is communicated to the central computer, or is transmitted to and stored in the smart tag 200, for later retrieval and use.

When the visitor has completed his visit, i.e. has visited those of stations 10-1 through 10-N that he desired to visit or that time permitted a visit, the visitor then utilizes his smart tag 200 to check out of the exhibition at check out station CS. Check out station CS provides the visitor with a tangible record of his visit to any desire degree of detail. For example, a simple form of such tangible record may include the visitor's identification and a list of stations visited. A more comprehensive form of the tangible record may include the visitor's identification, a list of the stations visited, a list of the data items requested at each station, and, with advance entry of data items or of links to the data items by the exhibitors, the data items requested.

Moreover, such tangible record may be any one or more of a printed document, a computer floppy disk, a computer CD-ROM disk, or any other desired medium. Where the tangible record is a computer readable medium, such as a floppy disk or a CD-ROM disk, the medium, the computer readable files thereon may include files directing access to either a central web site or to particular exhibitor's web sites at which the visitor may access and/or retrieve data items.

In addition to providing a record of a visitor's visit to the visitor, system 20 can also provide a record of the visitors who visited each station 10-1 through 10-N as well as a record of the data items requested by each visitor. Such records are very useful to an exhibitor for identifying potential and present customers and/or clients and their interests, their requests, and any other information gathered. Such visit records can be provided to each exhibitor in any of the formats that tangible records can be provided to the visitors. Moreover, such records may be made available to exhibitors as frequently as the information is transferred to central processor CP from electronic gates 100-1 through 100-N via communication means CM.

Communication between the registration station RS, the various stations 10-1 through 10-N, checkout station CS and central processor CP may be via any suitable communication means CM including but not limited to wire, cable, optical fiber, local area network (LAN), wide area network (WAN), radio transmission, optical transmission or other suitable means, or any combination thereof, with or without one or more communication hubs. Such communication may be in real time, be periodic or aperiodic, and may include one or more communications, and may utilize any suitable format or protocol, such as the RS485 and/or RS232 standards. Where information is written to and stored in smart tag 200 at each of stations 10-1 through 10-N visited, communication may be by check out station CS reading the information so stored in smart tag 200. Smart tag 200 may be collected by check out station CS, thereby permitting reuse of the smart tags 200 for a subsequent visitor at a given exhibition or at another exhibition.

Figure 5A:
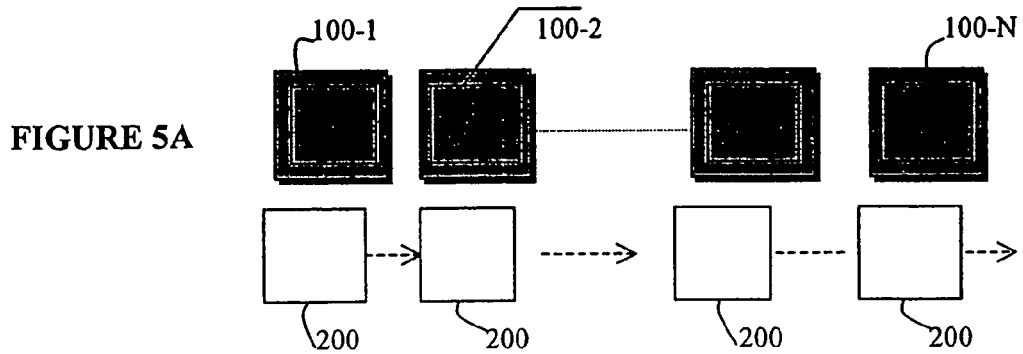
FIGS. 5A and 5B are schematic block diagrams illustrating examples of one or more stations and/or operations thereof and useful with a system as described.
Figure 5B:
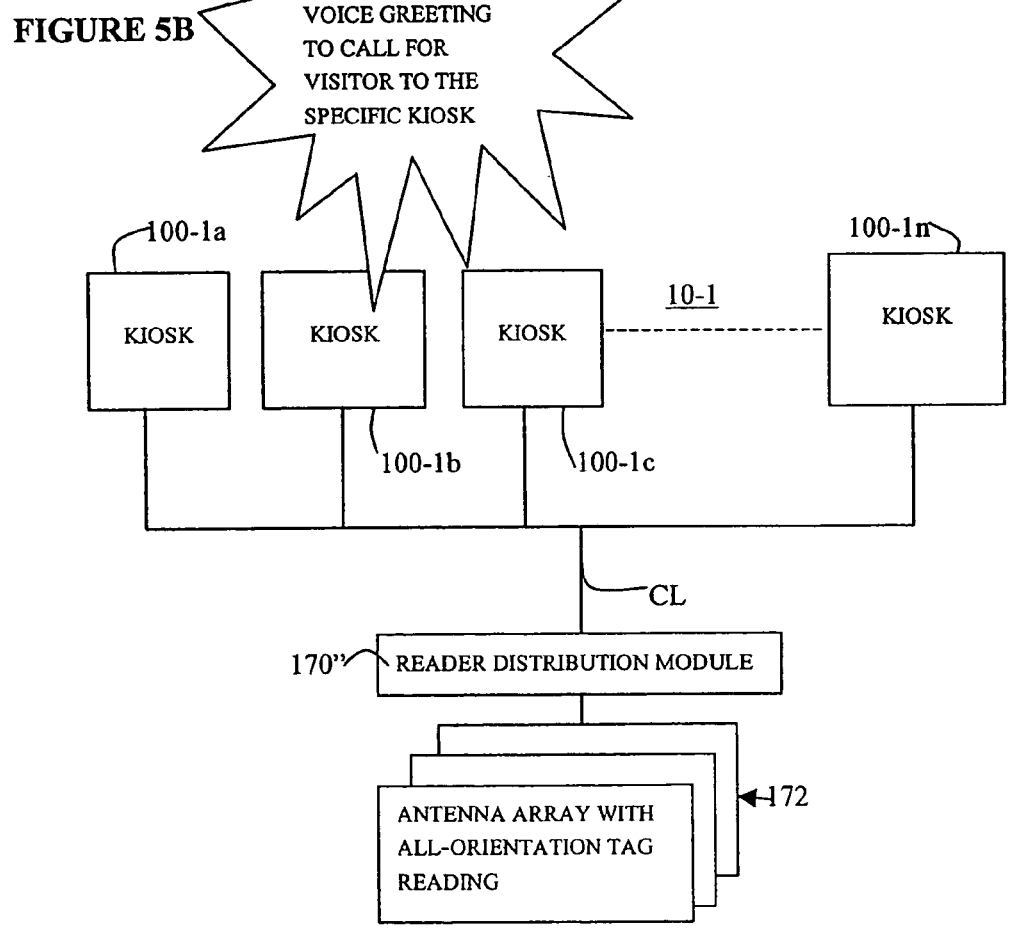

FIGS. 5A and 5B are schematic block diagrams illustrating examples of one or more stations 100-1 and/or operations thereof and useful with a system 20. Electronic gates 100-1 through 100-N are, for example, interactive kiosks (i.e have a display and input device, as described above) at respective stations 10-1 through 10-N. In the arrangement of FIG. 5A, the kiosks 100-1 through 100-N are not linked by a communication means to a central computer CP, but communicate information that is stored in the memory of smart tag 200 as it is proximate electronic gates 100-1 through 100-N, i.e. within the detection region of the antenna thereof. Dashed lines indicate movement of smart tag 200 past various stations 100-1, . . . 100-N. Smart tag 200 stores information that is eventually read out and provided to the visitor and/or to exhibitors in the form of a tangible record.

In the arrangement of FIG. 5B, plural interactive kiosks 100-1a, 100-1b, . . . 100-1n at station 10-1 are coupled by communication link CL to a smart tag reader/writer distribution module 170" to a common array antenna 172. When a visitor enters station 10-1, his smart tag 200 is detected by reader/writer 170" via antenna array 172 and he is greeted by the next available one of kiosks 100-1a, . . . 100-1n. As a result, plural visitors may be accommodated at a station 10-1 at a particular time because each may interact with a particular one of the available interactive kiosks 100-1a, . . . 100-1n, e.g., via a keyboard or touch screen display. In terms of FIGS. 1 and 2, for example, each of kiosks 100-1a, . . . 100-1n includes a display 110 and an input device 120, with all of kiosks 110-1a, . . . 100-1n being coupled to a processor 150 associated with smart tag reader/writer 170".

Figure 6:
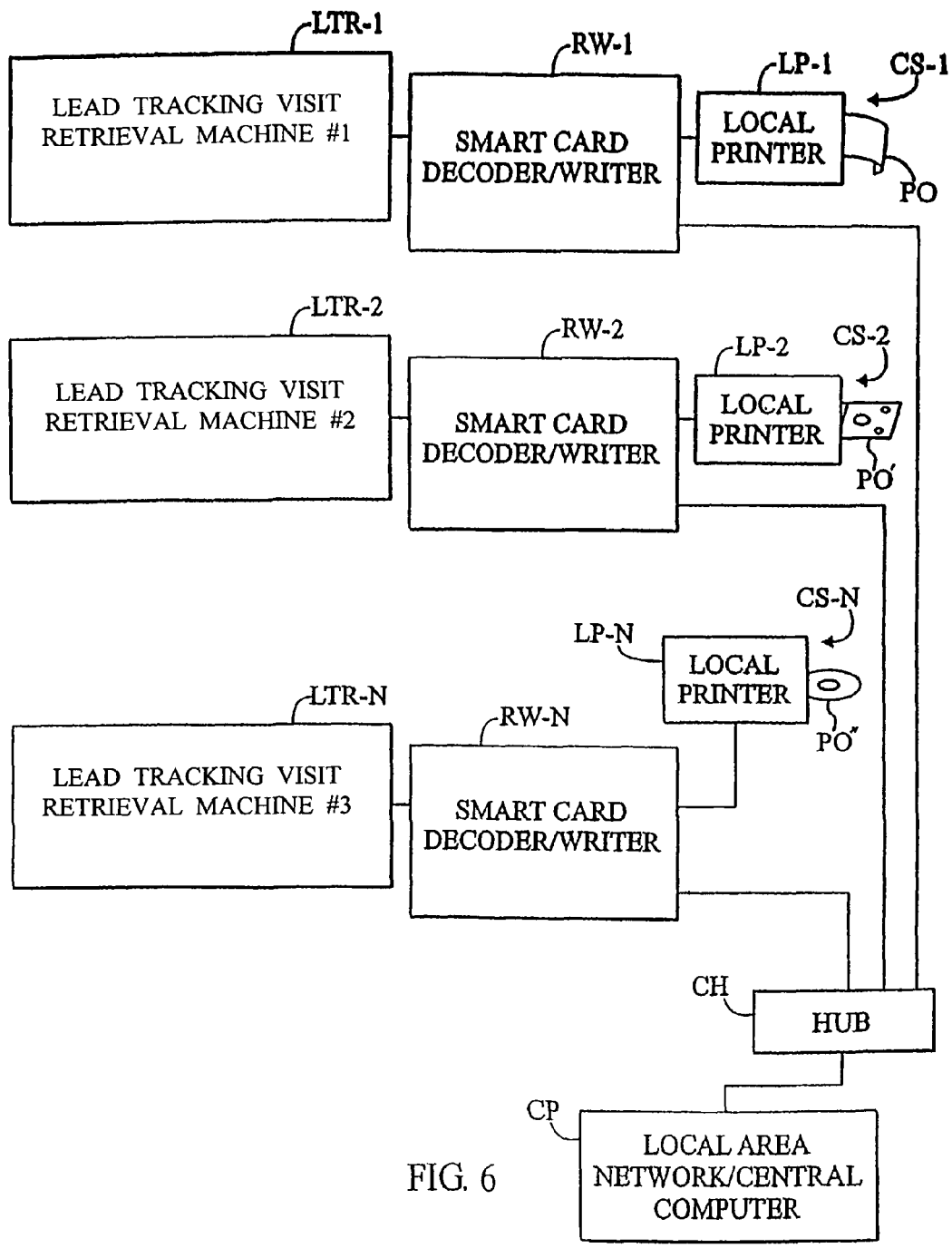
FIG. 6 is a schematic diagram illustrating an example of a check out station of the tracking system.

FIG. 6 is a schematic diagram illustrating an example of a check out station CS of the tracking system 20. Check out station CS may include one or more check out modules CS-1, CS-2 through CS-N, where the number of check out modules is selected to accommodate the number of visitors expected to check out at any given time or period of time. Larger exhibitions should employ a greater number of check out modules to reduce the waiting time of visitors waiting to check out to an acceptable time, while smaller exhibitions may employ lesser numbers of check out modules.

Each of check out modules CS-1, . . . CS-N includes a lead tracking visit retrieval machine LTR, a smart tag decoder reader/writer RW, and a local printer LP to provide a tangible record of each visitor's visit, as described. In checking out, a visitor presents his smart tag 200 to a reader/writer RW which reads the information stored therein, i.e. which includes at least visitor registration information and may also include station visit information and data item information. Where the visitor may keep the smart tag 200 badge, the reader RW may read the card at a distance, as is preferred at the various exhibit stations or booths, and may also write information to the smart tag. Where the smart tag 200 is to be collected for re-use, reader RW may have a slot into which the smart tag 200 is inserted from which it is read and automatically collected by a collection mechanism included in reader RW.

Lead tracking visit retrieval machine LTR is a processor or is in communication with a central processor CP for retrieving the names, addresses and other information of the exhibitors of the stations visited by the visitor as indicated by the information read from his smart tag 200. Exhibitor information, such as name and address information, product and service information and the like, is retrieved from a relational database in central processor CP into which it has been entered by the exhibitors, either during or before the exhibition. The record of the visitor's visit, including visitor and visit information read from his smart tag as well as exhibitor information retrieved from the relational database of processor CP is sent to local printer LP for providing a tangible record of the visitor's visit on any desired medium, as described. Examples of such media include a paper document PO as illustrated in association with printer LP-1 of check out station CS-1, a computer floppy disk PO' as illustrated in association with printer LP-2 of check out station CS-2, and/or a computer CD-ROM disk PO" as illustrated in association with printer LP-N of check out station CS-N.

Suitable processors (both local processor LC and central processor 200) include any modern personal computer (PC), such as those having a Pentium®, Celeron®, or similar processor, running a Windows, Unix or other PC operating system. Where a LAN or WAN network is employed, standard PC networking hardware and software may be included in the PCs. Desirably, the processors, as well as the smart tag control units readers/writers, will have redundant memory and information storage, such as by one or more of non-volatile memory, a hard disk drive, a floppy disk drive, a CD-write drive and the like.

Applications relational database programs suitable for recording and manipulating the information include relational data base software such as the Windows-NT-based Microsoft ACCESS data base and/or the Microsoft SQL (sequential query language) database, as well as ORACLE, SYBASE and INFORMIX data base software, and software languages such as Visual Basic, Java, or other language compliant with American National Standards Institute (ANSI) Standard 256. Each data base record will typically include fields some or all of the information mentioned herein.

Available smart tags operate at RF frequencies between hundreds of kilo-Hertz (KHz) and several giga-Hertz (GHz). Typical frequencies for RF smart tags and smart cards (functionally the same but different in form) include 125 KHz, 13.56 MHZ, 915 MHZ and 2.45 GHz. Examples of suitable electronic chips include the "I-CODE" devices available from Philips Electronics of the Netherlands, the "Tag-It" devices available from Texas Instruments of Dallas, Tex., the "Pico-tag" devices available from Inside Technology of France, and the "MIFARE" devices available from Philips Electronics of The Netherlands and from Infineon Electronics which can operate at the frequency of 13.56 MHZ. Other commercial sources of electronic devices for smart tags and smart cards include Microchip Corporation of Phoenix, Ariz., Amtel Corporation of Colorado, Single Chip Systems of San Diego, Calif., and Hitachi of Japan. Such electronic devices typically have writeable memory capacity of at least 128 bytes and preferably have more than 500 bytes of writeable memory.

Suitable smart tag reader/writers include the lead tracking apparatus available from Avante International Technology, Inc. located in Princeton, N.J., the Fast-Track system available from Escort Memory Systems located in California, the Interrogator Control Module available from Samsys Technologies, Inc. located in California, and the Memor 2000 RFID available from Minec company located in Taby, Sweden, as well as readers/writers available from Intermec Technologies Corporation located in Everett, Wash., Fargo Electronics, Inc. located in Eden Prairie, Minn., or from Atlantek, Inc. located in Wakefield, R.I., or from Avante International Technology located in Princeton, N.J.

Communication with central processor CP is via any suitable communication link or links, which may include one or more local, central or distributed communication hubs CH. Exhibitor information may include catalog and/or sales brochure information and other information that has been entered into processor Cp or for which processor CP has links stored in its relational database, thereby allowing such information to be accessed and retrieved for inclusion in the visitor's individual tangible record.

Therein lies one advantage of the present arrangement. Each visitor can be provided a tangible record of his visit and all of the data items he requested at the time he leaves the exhibition, whether the tangible record is provided in printed or document form, or is provided in electronic form either directly on a computer readable medium or indirectly via links to Internet web sites stored on a computer readable medium. Moreover, by providing the desired data items on computer readable media, the visitor has the desired information and data items in a conveniently portable form, rather than as a heavy collection of paper documents.

FIG. 7A is a schematic representation of a memory allocation 240 suitable for a smart card 200 for use with the system and method described herein. Sections 242, 244, 246 of memory 214 of smart tag 200 are allocated or segmented for the storage of particular information. Typically, an EEPROM memory is utilized.

Manufacturers of the electronic devices or chips utilized in smart tags typically segment the memory thereof into two segments: a first segment 242 into which the manufacturer burns in (i.e. permanently stores in a way that the information cannot thereafter be changed) a unique identifier of the electronic device or chip. Such permanent number 242 may be tens or hundreds of bits in length, as is appropriate for providing a unique identifier. The remainder of the memory capacity 244, 246 is left available for the storing of data therein in use, which data may be modified, written over or otherwise changed in the use of the electronic device.

Smart tags ST, ST' are typically utilized for tagging and electronically identifying objects by reading information stored in the electronic memory of the smart tag using contact-less radio-frequency (RF) transmissions. For the present smart tagging system and method, an electronic integrated circuit in the form of a semiconductor chip is connected to an antenna on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

While it is satisfactory to utilize only the stored permanent number identifier 242 to identify the smart tag containing the electronic device, it is preferred that the permanent number 242 be stored in a relational database in a processor and be linked to other identifying or use information for use in identifying the object or article to which the smart tag is attached or with which it is associated. Such processor is in communication with the smart tag readers that read information from memory 240 of the smart tags.

One potential problem associated with such smart tags occurs where the information desire to be stored therein is simply coded and written into the writeable memory 244, 246. In that case, any change to the information stored therein is undetectable. Typical sources of erroneous or corrupted or erased data include electromagnetic interference, whether accidental or intentional, as well as any intentional or unintentional attempt to modify the stored information, whether authorized or unauthorized, such as by a thief or counterfeiter. Having other than the correct data stored in the memory of the smart tag can lead to misdirection, loss or damage to property and/or injury to person, none of which is desirable or acceptable.

To reduce the likelihood of undetected erroneous stored information, the remaining memory 244, 246 available to the smart tag user is further segmented into two segments. The first segment 244, which is typically of greater memory capacity, is allocated for the storage of application specific data, such as the visitor identification information, 244a, and for information 244b that is written back to the smart tag memory by the smart tag reader/writer at the various stations, such as booths visited, data items requested and the like. The second and smaller memory segment 246 is allocated for storing a relational check number or code that is a calculated or coded value representative of at least the value of the stored application specific data, and preferably representative of the value of both the permanent number and the application specific data. Herein, the relational check number or code is usually referred to simply as the relational check number to include numbers and/or codes.

Where the smart tag includes processing capability, the processor can be programmed to calculate the relational check number upon each time data is written to its memory, preferably upon command to do so. Alternatively or additionally, each reader/writer or an associated processor or central processor can calculate the relational check number. Because the electronic device utilized in a smart tag has substantial memory capacity, the relational check number can include many bits and so can be constructed to permit error correction as well as error detection.

The foregoing arrangement permits detection of errors and/or changes to the application specific data at any time by reading the card and recalculating the relational check number which is then compared to the relational check number read from the smart tag. If the read and calculated relational check numbers match, then there is a high degree of certainty that the application specific data has not been changed and does not include errors.

It is noted that while the permanent number, the application specific data and the relational check number or code are referred to as "numbers," each may include numerical, alphabetic, alpha-numeric and other characters and symbols, conventional or arbitrary, as may be desired. The relational check number or code is representative of the information stored in the memory in accordance with a predetermined formula or algorithm or other scheme, either on a character by character basis or on the basis of one or more combinations of the characters or values stored in the memory. Suitable formula and algorithms include, for example, parity checks or other parity representations, sum checks, field relationship checks or any other predetermined relationship between the stored permanent number and application specific data values and the relational check number.

Thus, any change to the stored information, including a change that changes the stored value of the relational check number or code, will be detectable and an indication that the stored data contains one or more errors or changes. Typically, the particular formula or algorithm that generates the relational check number is not known to third parties and is not derivable from the data stored in the smart tag memory, and so the relational check number provides a degree of security for the information stored in the smart tags.

The formula or other algorithm or other encoder for generating the relational check code or number may be provided in protected firmware, in software or in a combination of firmware and software, to provide a higher level of security against deciphering or unauthorized coding. For additional security, each encoder may also include a unique identifier that must be paired with coding software having the same unique identifier for enabling proper functioning. The unique encoder identifier may also be included in or as part of the application specific data.

FIGS. 7B and 7C are schematic representations of memory allocations of a relational database of a processor suitable for use with the system and method described herein. Database 1240 represents an aggregation of records stored in relational database computer software running on a processor. Compiling records of data written to smart tags in a relational database is particularly advantageous where the data is written to the smart tag and where it is important to be able to retrieve such data should the smart tag be misplaced, lost or stolen, or if the information stored therein is changed or corrupted or lost for any reason.

In a complete database, database 1240 illustrated by FIG. 7A stores a record each time data is written to any smart tag used with the tracking system. Database 1240 includes, for example, a number of data fields comprising a list 1242 of the permanent numbers of the smart tags, a list 1244 of the application specific data of each writing of application specific data to each smart tag, a list 1246 of the relational check number written to each smart tag with each writing of application specific data thereto, and a list 1248 of tag coding identifiers such as the date, time, reader/writer identification for each writing of application specific data to each smart tag. Lists 1242, 1244, 1246, 1248 are comprised of aggregations of records corresponding to each writing of information to each smart tag, and may be provided from one or both of the smart tag and the reader/writer utilized for each writing of information.

In a simplified database, database 1240' includes, for example, lists 1242, 1246 and 1248. This database arrangement may be advantageous where the database is stored in a local processor and/or a smart tag reader/writer where available memory capacity may be more limited than in another processor. In either a complete or simplified data base, information relating to each writing of information to each smart tag is communicated to a processor in real time or delayed, and may be periodic or aperiodic. Information may be communicated by any of the means described as well as by manual communication, e.g., by transporting the smart tag reader/writer and/or local processor and/or computer media containing the information stored in such smart tag reader/writer and/or local processor to another processor.

Suitable relational database software include ACCESS and/or SQL (sequential query language) database software which run on conventional PC processors with standard operating systems, such as Windows-NT, available from Microsoft Corporation of Redmond, Wash., as well as the ORACLE, SYBASE and INFORMIX database software. Preferably the database software is "Internet-ready" in that it includes features facilitating connection to and communication of information via the Internet.

Each database record will typically include fields for some or all of the following application specific data or information in addition to the permanent number:

Visitor information including but not limited to visitor identification, name, address, business and/or personal affiliation, member number, registration number and/or other identifying number, and the like.

Visit information including but not limited to booth/station identification, contact personnel identification, entry and exit time data (arriving and leaving), date, keypad/keyboard entered data, data item/information requests, interest in products/services, follow-up information, smart tag information, and the like.

Relational check number representative of any or all of the foregoing application specific data and/or the permanent number of the smart tag.

Where the information written to each smart tag is all communicated to and stored in a central data base and where all subsequent action to be taken will be taken based upon the information stored in the central database, then the use of a relational check number to verify the information stored in the smart tag and/or detect errors in and changes thereto is of much less importance.

In any case, the central data base can be utilized to provide particular information, general information, status information, statistical information, and other information on an on-line basis that is at least as current as the entry of record information into the database. Where every writing of information to a smart tag is also replicated in a record stored in the relational data base, the relational database contains and can provide a detailed history of the utilization of the smart tag, e.g., the path of the visitor's visit to the exhibition and the date and time of each visit to each booth as well as information requested or entered at each such visit.

Figure 8A:
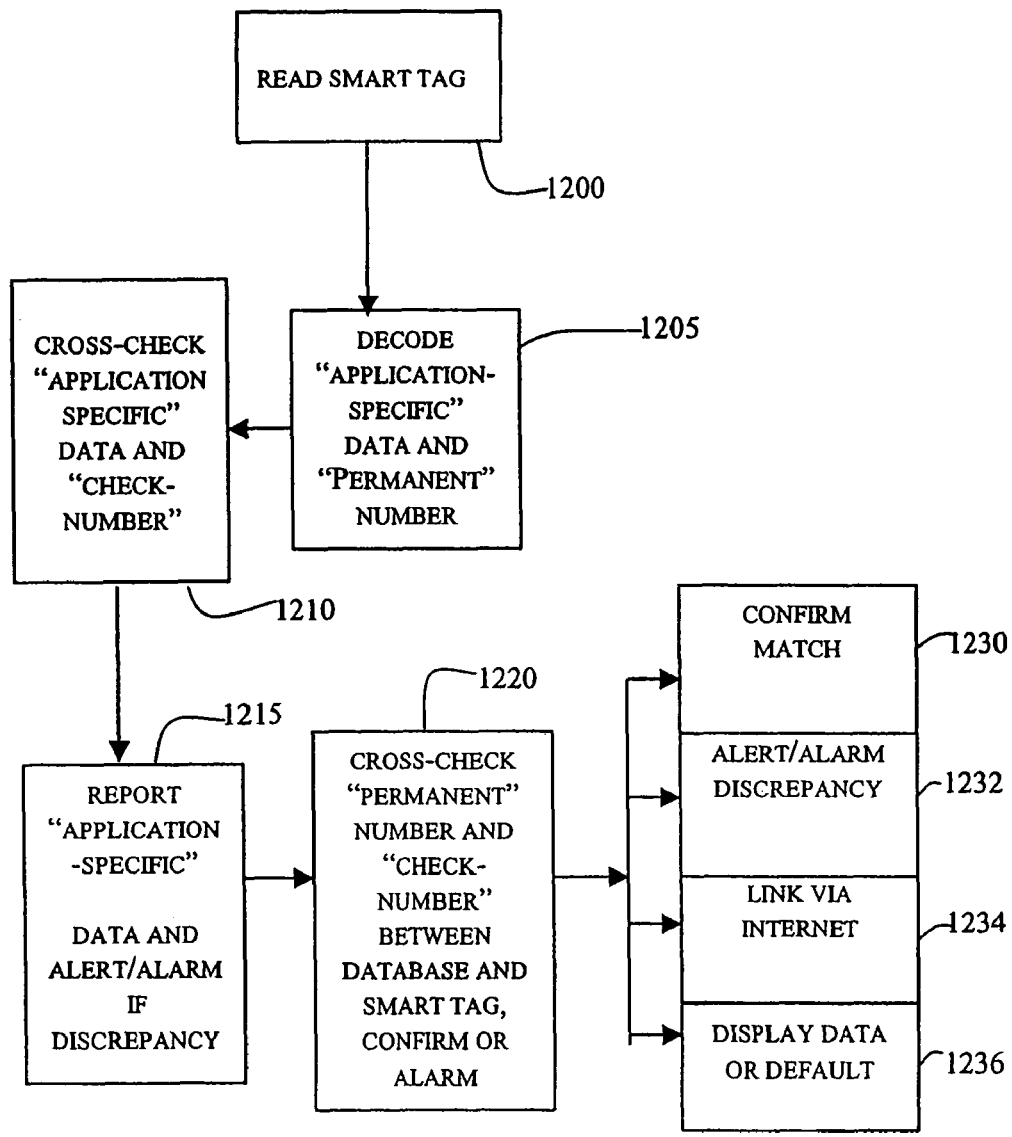
FIGS. 8A and 8B are flow chart schematic diagrams of examples of utilization of the memory allocations and relational data base arrangements of FIGS. 7A-7C.

FIG. 8A is a flow chart schematic diagram of an example of a utilization of the memory allocations 242, 244, 246, and of memory allocations and relational data base structures 1242,

1244, 1246, 1248 of FIGS. 7A-7C. Information from the smart tag is read 1200, such information including, for example, a permanent number related to the particular smart tag, application specific data relating to the visitor and visits at an exhibition, and a check number representative of at least the application specific data and preferably the application specific data and the permanent number. Application specific data read from the smart tag is decoded 1205 and the permanent number read from the smart tag is stored.

A cross check 1210 is made between the application specific data and the permanent number read from the smart tag. Cross check 1210 includes calculating from the application specific data and the permanent number the value of the check number and comparing that calculated value to the value of the check number read from the smart tag. If the two check numbers correlate, then there is a high degree of confidence that the application specific data does not contain errors and has not been altered. It is noted that cross check 1210 is performed at least initially using only the information read from the smart tag and so does not necessarily require a central processor or database. If there is a non-correlation or other discrepancy, such non-correlation or discrepancy produces an alarm 1215 and further correlation steps may be taken.

Results of the reading of smart tags and of the correlation of the check numbers thereof are reported 1215 in any convenient form. Such reporting may be by aggregation of records in a data base for current or delayed review, by displaying the results or summaries of results or statistics related to results on a human-perceivable display, or by initiating an alarm 1215 of lack of correlation of check numbers. Such alarm may take the form of a print out, a paper document, a visual display, a warning screen, an audible signal, a signal to a control or monitoring station or to a pager or cell phone, or any other convenient form of alarm or signal.

A further cross check 1220 may be made to check at least the permanent number and relational check number stored in the database to the permanent number and relational check number read from the smart tag. Because the permanent number of a smart tag cannot be changed, cross check 1220 includes comparing the relational check number read from a particular smart tag having a given permanent number with the relational check number stored in the relational database for the most-recent record corresponding to that given permanent number. Correspondence or lack of correspondence of the respective relational check numbers from cross check 1220 is utilized to confirm such correspondence or lack thereof by human-perceivable display or alarm, as described above.

In particular, correspondence in cross check 1220 initiates confirming a match 1230, e.g., by any human-perceivable display, report or alarm, as described above. Lack of correspondence in cross check 1220 is a discrepancy that initiates giving an alarm 1232, e.g., by any human-perceivable display, report or alarm as described above.

Initiating a human-perceivable display or alarm, or communicating information to or from another location can include linking 1234 the processor performing any of cross checks 1210 and 1230 and/or producing a report or alarm 1215, 1230, 1232, to a remote processor, display or alarm via the Internet. Such linking via the Internet 1232 may include accessing a remote relational database, which may be an open database to which information can be added, deleted or changed or which may be a closed database not allowing information to be added, deleted or changed via the Internet link. Access may be controlled by access codes, passwords and the like as desired, and information communicated via the Internet may be encrypted, to provide the desired degree of security.

Further, correlation or lack of correlation or any other difference between the information read from a smart tag and the related information stored in the relational database initiates displaying 1236 data from any one or more of the smart tag and a local or central relational data base, or if such data is limited or missing, displaying 1236 a default indication, e.g., whatever information is stored in the database. Displaying 1236 may include displaying information from the smart tag and the relational data base or may be limited, e.g., to displaying the differences and/or discrepancies of that information, and may be immediate or delayed. Displaying 1236 may be for each cross check 1210, 1220, or may be for any number of cross checks 1210, 1220.

The display of the result or status of any step and/or of the information to which attention is to be drawn may be included in a display of information, e.g., such as by highlighting or coloring the portion of the displayed information to which attention is to be drawn, or by separately displaying the information to which attention is to be drawn. Where information desirable to be displayed is available in the relational data base, such information is retrieved and displayed automatically, either locally, remotely or via the Internet, as appropriate. If such information is not so available, a warning or instruction to an operator is provided to instruct the operator to either retrieve the information or to segregate or mark the affected smart tag for special treatment or handling, e.g., such as alerting an attendant at the check out station when someone uses that smart tag to check out.

It is noted that the foregoing arrangements and method also can enable the detection of changing or tampering with the information stored in the smart card for the unlikely case where the changing or tampering is done with knowledge of the calculation of the relational check number. In such case, the relational check number is correctly related to the application specific data and/or the permanent number and so the simple cross checking 1210 will not detect the changing or tampering. Because the information written to each smart tag is also stored in the relational database correlated to the smart tag unchangeable permanent number, comparison of the changed or tampered-with information read from a smart card is detectable by cross checking 1220 that read information against the information stored in the relational database.

Where desired, the relational database may be accessed and made available by any convenient means, e.g., by providing same on floppy disk or CD-ROM, optical CD and the like that is easily sent by mail, express and the like, or by making same available via communication means such as wire, cable, optical fiber, LAN, WAN, optical or radio frequency transmission, the Internet and the like.

Figure 8B:
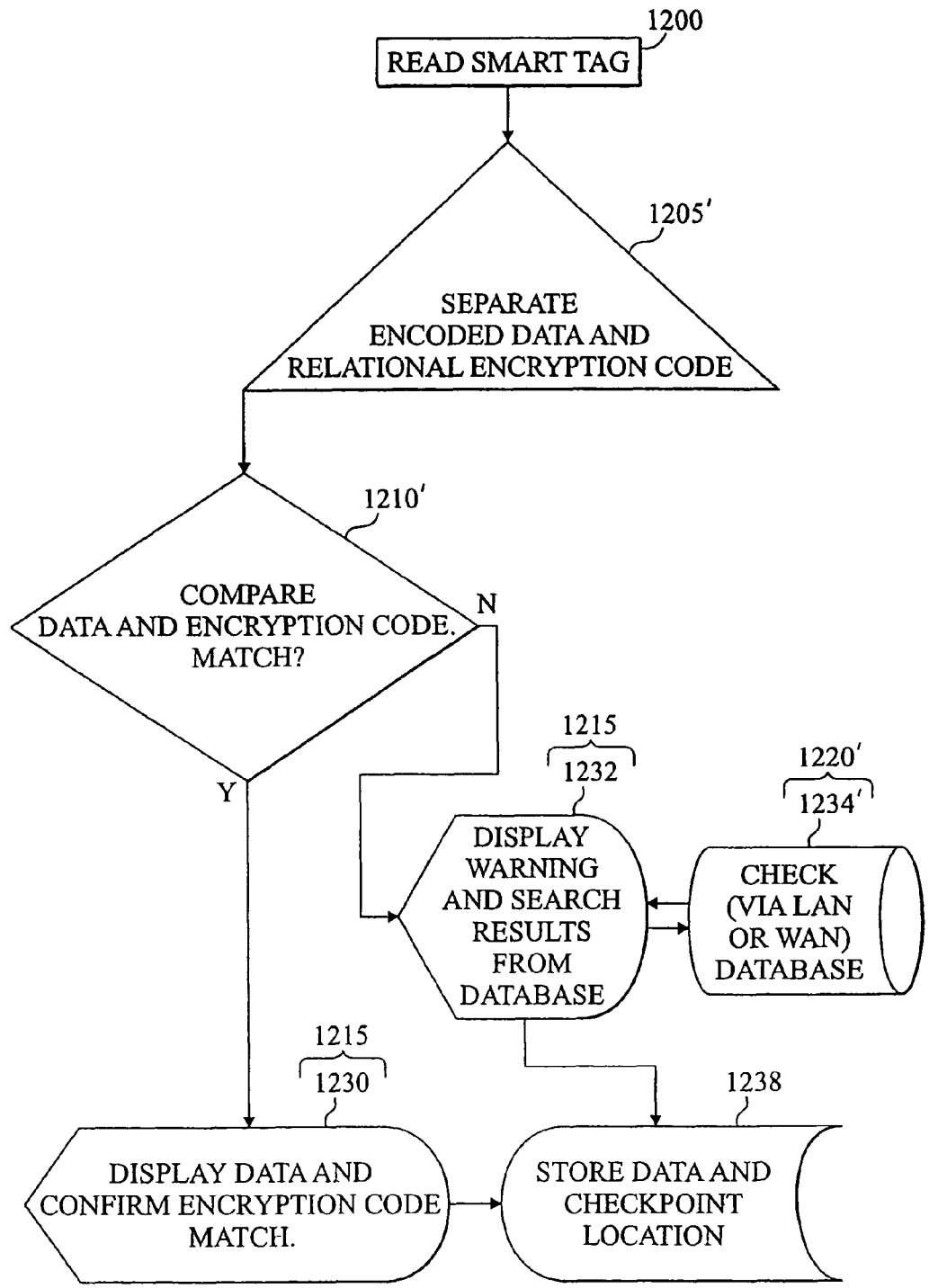

FIG. 8B is a flow chart schematic diagram of another example of a utilization of the memory allocations 242, 244, 246, and of memory allocations and relational data base structures 1242, 1244, 1246, 1248 of FIGS. 7A-7C. It is noted that the steps of FIG. 8B include steps as described above in relation to FIG. 8A, but arranged for a more direct illustration of certain steps. Information from the smart tag is read 1200, such information including, for example, the permanent number related to the particular smart tag, application specific data, and a relational check number (also referred to as a "relational encryption code") representative of at least the application specific data and preferably the application specific data and the permanent number.

The encoded application specific data and relational check number read from the smart tag are decoded and separated 1205' and are compared 1210' to determine whether the relational encryption or check code or number read from the smart tag corresponds to or matches the relational encryption or check code or number recalculated by the processor from the application specific data and the permanent number read from the smart tag. I.e. match 1210' is a cross check that includes calculating from the application specific data and the permanent number the value of the relational check number and comparing that calculated value to the value of the check number read from the smart tag.

If the two check numbers correlate (i.e. match, path "Y"), then there is a high degree of confidence that the application specific data does not contain errors and has not been altered, and the application specific data is displayed 1215/1230 along with confirmation that the relational check number correlates.

If there is a non-correlation (i.e. non-match, path "N") or other discrepancy, such non-correlation or discrepancy produces the display of a warning or alarm 1215/1232 and initiates further correlation steps. Such further steps include retrieving 1220'/1234' from a relational database records stored therein corresponding the particular smart tag related, for example, by its permanent number, and displaying or posting 1215/1232 such retrieved stored records. Access to the relational database, if not direct in the processor, is by communication 1220'/1234' with a processor via communication means, typically a LAN or WAN, or via the Internet.

Whether there is correlation or non-correlation of the relational check number, a record is stored 1238 in the relational data base including the information read from the smart tag in step 1200, whether or not the read data correlated or not in step 1210', and the identity of the station or check point at which such data was read.

Figure 9:
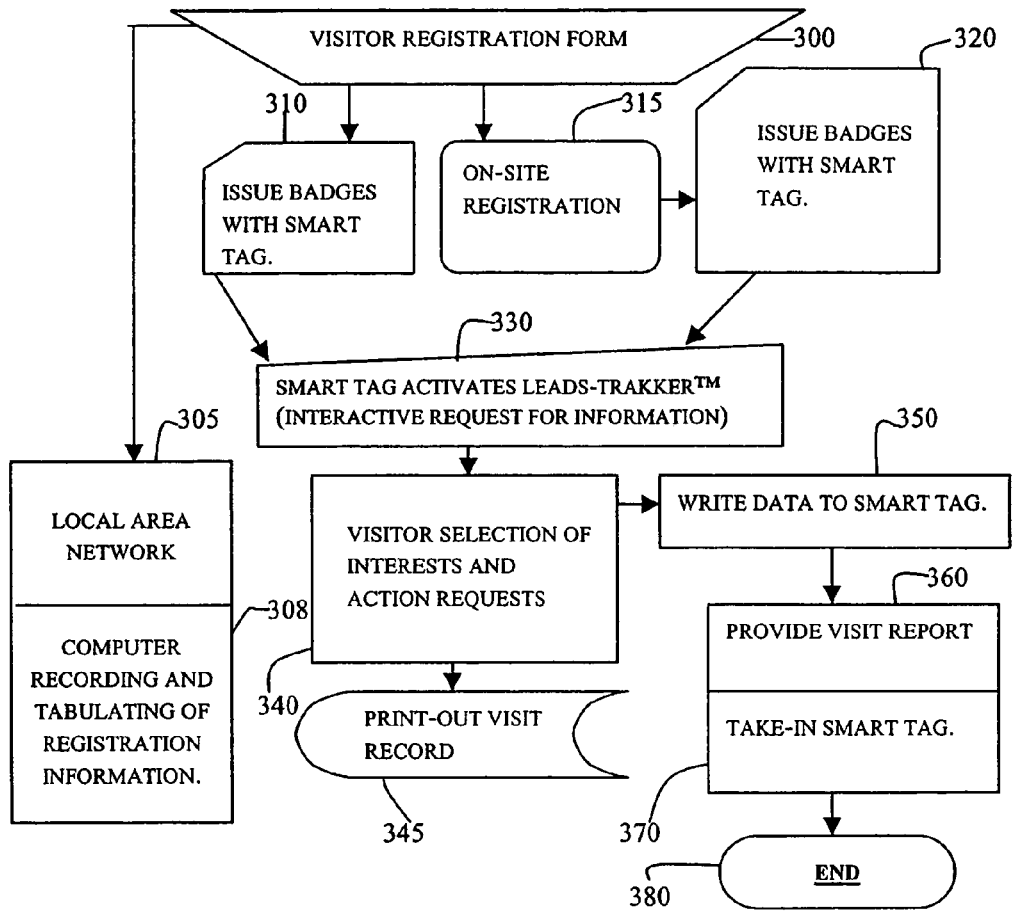
FIG. 9 is a flow chart schematic diagram of an example of the method of a tracking system.

FIG. 9 is a flow chart schematic diagram of an example of the method and operation of a tracking system. Registration 300 of visitors typically begins in conventional manner by the visitor submitting a registration form containing necessary and/or desired information pertaining to the visitor, such as name, address, business or personal affiliation, telephone and facsimile numbers, e-mail address and the like. Registration may also include registering for special events or sessions, such as luncheons, dinners, receptions, performances, tours, and the like. Registration 300 may be accomplished in advance and/or remotely of the exhibition or may be "walk-in" or "on site" registration 315 at the exhibition. Advance registration may be by mail, e-mail, communication network, telephone, the Internet, or any other medium, and may or may not involve the payment of fees or admissions, the use of "free passes" or complimentary admissions and the like.

"Badges" including a smart tag are issued 310 to preregistered visitors and are issued 320 to on-site visitors. Smart tag badges include an electronic device or chip having a memory and a processor for transmitting and receiving information wirelessly via an antenna. Preferably, the smart tag badge also includes traditional badge attributes in human readable form, such as the visitor's name, the exhibition name or symbol, company affiliation, and the like. Such human readable information may be printed directly on the smart tag or on a paper or plastic label that is affixed thereto. The smart tag badge may be a smart card (i.e. the same smart tag chip and antenna in a plastic card similar to a credit card) where it is desired that visitors retain same as for post-exhibition advertising and/or a souvenir. Issuing 310, 320 an identification badge may be by mail or other means or may be in person either on site or off site.

Issuing 310, 320 a smart tag badge preferably includes associating the visitor with the permanent number of the smart tag electronic chip as well as with a registration number, a member number or other identifier stored in the smart tag memory. Issuing 310, 320 further includes entering visitor identification information and/or exhibition information into the memory of the smart tag, and recording (storing) 305 some or all of the foregoing information in a relational database of a processor.

Storing 305 of visitor and registration information in a processor or computer relational database for recording and tabulating visitors and their registration information may be via a local or wide area network, the Internet or any other communication medium. Print outs or other reports of visitor information from the relational data base may be provided to exhibitors and/or the organizer or sponsor of the exhibition.

The visitor then attends the exhibition, visiting whichever booths or stations he desires. At each booth or station equipped with a smart tag reading lead tracking electronic gate, the smart tag is activated by and/or activates 330 the lead tracking electronic gate for the reading of information stored in the smart tag memory. Activation 330 includes one or more of reading and optionally storing the information from the smart tag memory, displaying or announcing a welcome or greeting which may be personalized by visitor information read from the smart tag, and optionally writing 350 information, such as exhibitor and visit information, to the smart tag memory.

Writing 350 information to the smart tag memory may include writing exhibitor information relating to the identity of the station and its exhibitor, and visit information such as time and date of visit, expressions of interest, requests for data items, i.e. any information selected or entered 340 or otherwise provided by the visitor or the exhibitor such as via a keyboard, touch screen or other input device. Writing 350 also includes storing the information, preferably in a relational database, either in a local processor and/or by communicating the information to a central processor. Such information is retrievable 360 as a printed report, a floppy or CD-ROM disk or other convenient form, or by electronic access, at a convenient time. Where the information is stored in a relational data base, only the exhibitor identification number and visit information need be stored in the smart tag.

Optionally, a local printer may print out or otherwise provide 345 a record or report of the visit for the visitor, the exhibitor or both. Print outs may be provided by a simple and inexpensive thermal, dot-matrix or ink-jet printer. If provided at the time of the visit, such report may be used to verify that the desired information has been obtained, for more efficient follow up, and may, where the exhibitor has entered suitable files into the processor of the lead tracking electronic gate, include data items requested by the visitor. Advantageously, such data items are those of interest to the visitor and are produced as needed and in the quantities necessary to meet visitor requests, and the exhibitor need only carry a floppy disk or CD-ROM disk to its booth; there is no need to transport cartons of documents to the booth.

Providing 360 a visit report principally pertains to a visitor checking out of the exhibition, e.g., at the end of a visit, at the end of a day, or at the end of the exhibition. In response to the visitor smart tag being detected at a check out station which includes a smart tag reader, information stored in a memory, which may include some or all of visitor information, visit information and exhibitor information, is retrieved and provided in suitable format, such a printed report, a floppy or CD-ROM disk or other convenient form. Such information is retrieved from the relational database of a processor where visitor information, registration information, visit information and exhibitor information are communicated thereto and stored therein during the exhibition and is retrieved from the memory of the visitor's smart tag badge where such information is written to the memory of the smart tag as the visitor visits the various booths and stations of the exhibition and enters information via a keyboard, touch screen or other data input device. If visit information is stored in the visitor smart tag, such information when read at check out is preferably stored in a relational database of a processor at the check out station or a central processor.

Providing 360 a report also pertains to providing reports to exhibitors and to exhibition organizers and sponsors in similar manner, although the particular information provided is customized according to the needs and interests of the person for whom the report is produced. An exhibitor can be provided records of visitors to its booth or station and of the information provided and/or requested and the like. The organizer/sponsor can be provided lists of visitors and exhibitors, information on the attendance vs. time of day and/or by exhibitor, which is useful for analysis, evaluation and planning.

The foregoing two paragraphs illustrate a powerful advantage of the present arrangement in storing visitor information, exhibitor information and/or visit information in a relational database from which the data can be retrieved according to criteria customized to meet the needs and interests of involved parties of various types, as well as for analysis and evaluation and planning, and reports can be similarly customized both as to content, form and format. Reports provided in electronic form, such as floppy or CD-ROM disk or via the Internet, may be in widely usable formats such as ASCII format, word processor format (e.g., WordPerfect or MS Word), database or spreadsheet format (e.g., Excel), in document format (e.g., Adobe Acrobat .pdf) and/or in any other convenient format.

Moreover, not all information need be stored in every location because an identification or tracking number relates all the information stored. For example, the permanent number of a smart tag points to the visitor information and his registration information, as well as to his visit information and requests for data items. Thus, the electronic gate need only store the visitor identification (permanent) numbers of the visitors thereto, because all the related data pertaining to those visitors can later be accessed in the relational database records. Similarly, the visitor smart tag need only store exhibitor identification numbers of the booths and stations visited because all of the information pertaining to each of the visitors visits to booths is retrieved using the exhibitor identification number to access the visit records stored in the relational database for that number and that visitor. As a result, the required memory capacity of the electronic gates and of the smart tags is substantially reduced from what would be required absent the relational database.

It is noted that smart tag reading lead tracking electronic gates, registration stations and check out stations may be owned, leased or rented by the exhibition organizer/sponsor and/or exhibitors, or by a facility in which an exhibition is held, as may be most advantageous for the parties involved. In particular, renting or leasing the apparatus has the advantage that all stations and booths at an exhibition will be compatible and will operated together in the manner described, and also avoids the exhibitors having to transport such apparatus to and from the exhibition. In addition, an exhibitor can easily and economically tailor the number and types of electronic gate(s) utilized to suit each exhibition, the size of its station thereat and the anticipated number of visitors.

Figure 10:
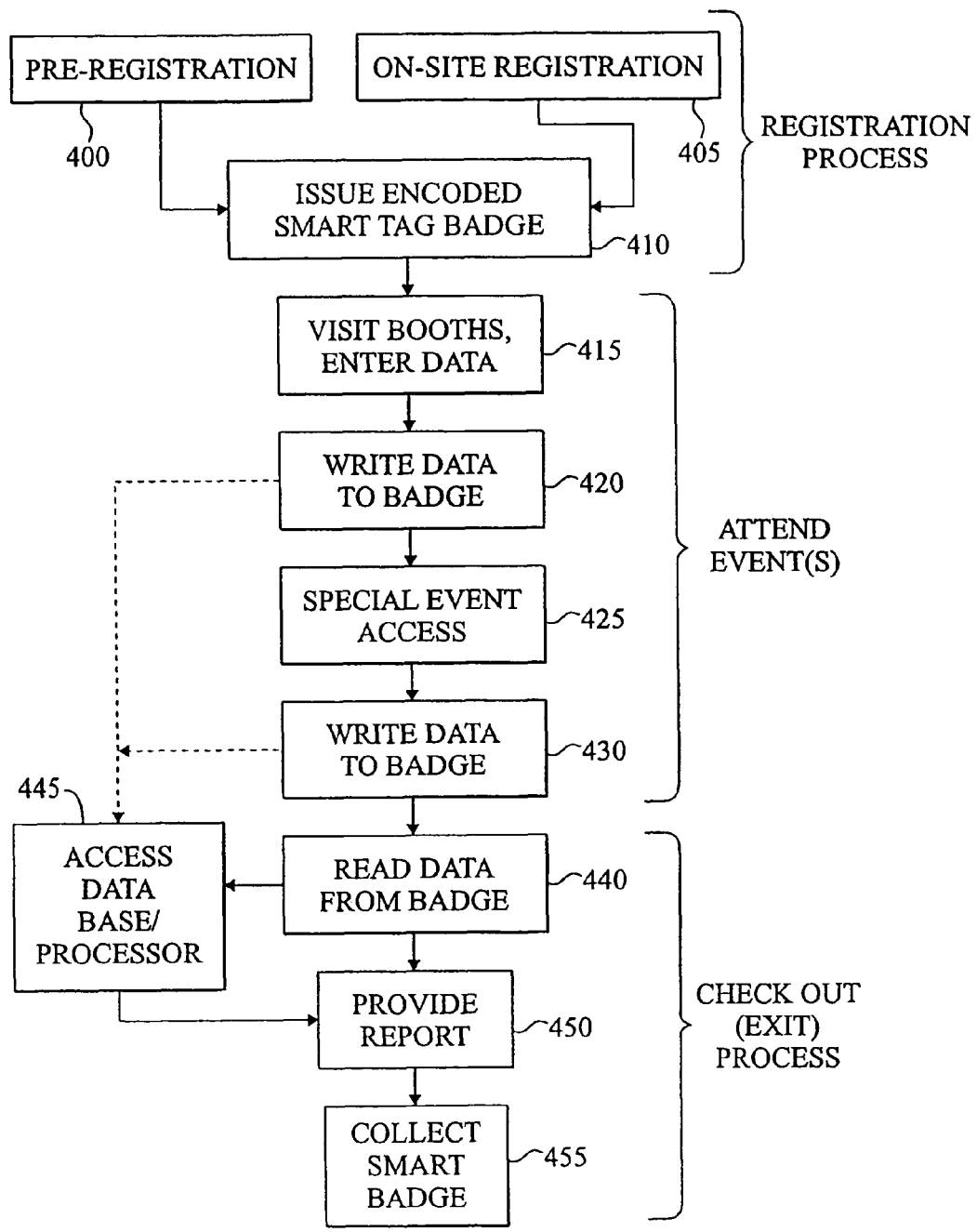
FIGS. 10, 11 and 12 are schematic flow chart diagrams illustrating an example of the method.

FIG. 10 is a schematic flow chart diagram illustrating an example of the method and operation of the present arrangement. A registration process includes either or both of pre-registration 400 and on-site registration 405 of a visitor leading to issuing 410 an encoded smart tag badge to the visitor, all as described above, for example, in relation to FIG. 9. The coded smart tag has information stored therein from the visitor registration, such as name, address, telephone and facsimile numbers, e-mail and/or web site address, title, affiliation, and any other entered data such as the visitor's interests. Where the exhibition includes special events requiring specific or additional registration or payment, indications of access permissions to such special events may also be coded to and stored in the smart tag.

Attending an exhibition typically includes visiting booths 415 and entering data, such as interests and data item requests, via a keyboard or touch screen thereat. Information from the visit to the booth is electrically written back 420 to the visitor's smart tag badge by a reader/writer, and the smart tag may also be electrically read to retrieve information stored therein for display, greeting, annunciation or later use. Writing information 420 to the smart tag may be associated with communicating and storing information in a relational database 445 (as represented by the dashed line to box 445), in which case complete information may be communicated to and stored in the database and only the exhibitor's number or booth number need be stored in the smart tag because the information stored in the database can be accessed using the exhibitor number stored in the visitor's smart tag.

Attending event(s) at an exhibition typically includes gaining access 425 to the place where each event is conducted. Access is granted or denied by electrically reading information from the visitor's smart tag badge and determining whether that information includes an indication permitting access to the particular event. Information that access to the event has been granted is written back 430 to the visitor's smart tag badge, thereby disabling it from use to again gain access to that event. The smart tag may also be electrically read to retrieve information stored therein for display, greeting, annunciation or later use. Writing event information 430 to the smart tag may be associated with communicating and storing information in a relational database 445 (as represented by the dashed line to box 445), in which case complete information may be communicated to and stored in the database and only the event number or other identification need be stored in the smart tag because the information stored in the database can be accessed using the event number stored in the visitor's smart tag.

A check out or exit process marks the end of the visitor's attendance at the exhibition. Checking out includes electrically reading 440 the data and information stored in the visitor's smart tag badge and communicating such information to access the relational database in the processor and store the information therein. Information from the relational database is utilized to prepare and provide 450 a report to the visitor in whatever paper or electronic format is appropriate, as described above. The report may include registration information, visit information, and event information, as well as lists of or copies of data items requested, all as described.

Where it is desired to collect 455 the smart tag badge, the check out station tag reader typically includes a mechanism to automatically take in the smart tag.

Figure 11:
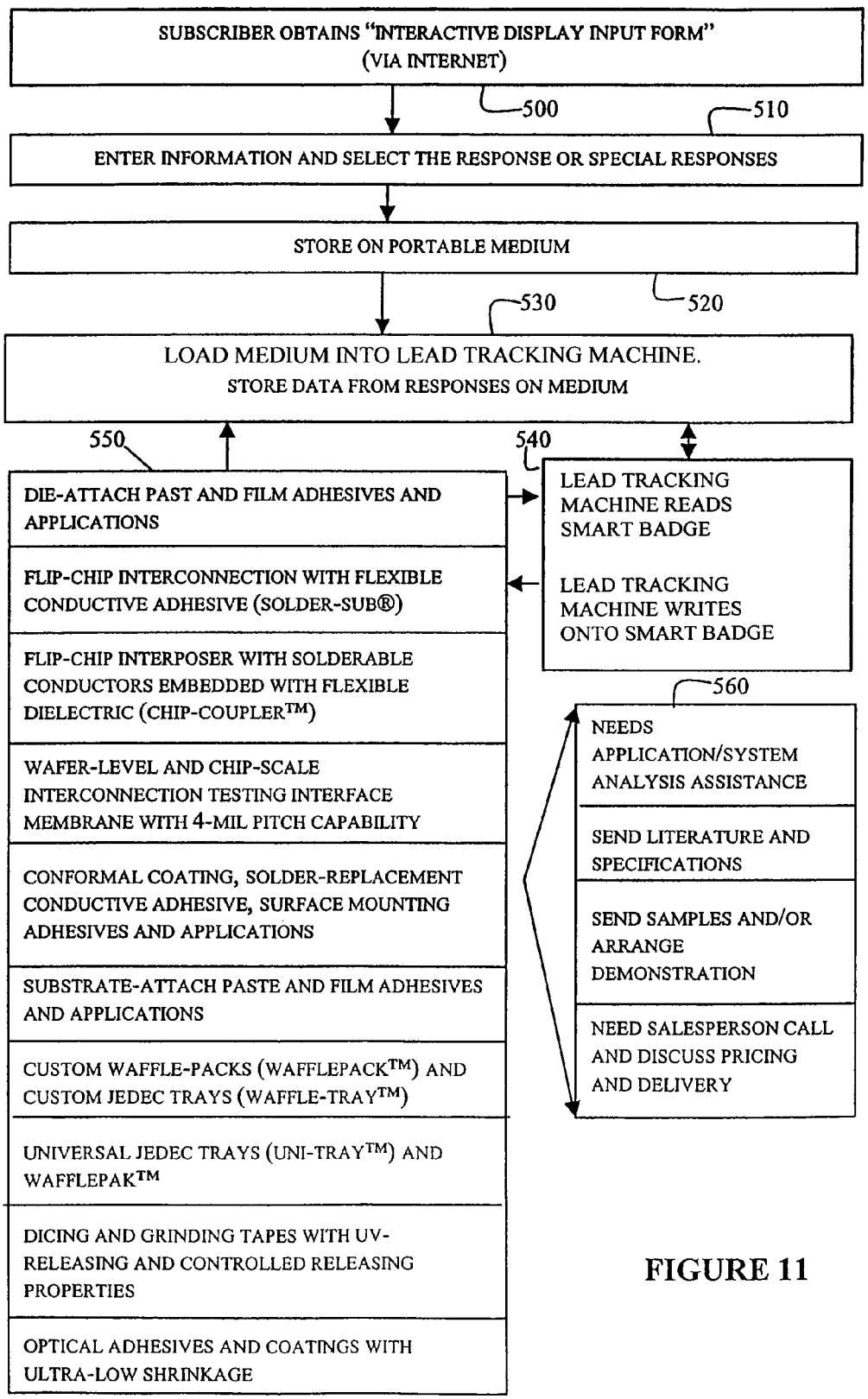

FIG. 11 is a schematic flow chart diagram illustrating an example of the method and operation of the present arrangement, in particular, as relating to registration of an exhibitor. An exhibitor obtains 500 an input form that he can complete to register as an exhibitor at an exhibition and/or enter information that can later be accessed at the exhibition. Preferably, access and entry of information is electronic, whether by receipt of an electronic form on a tangible medium such as a floppy disk or CD-ROM or via the Internet, and is interactive in that the exhibitor is prompted to enter data or otherwise respond. Registration via the Internet provides opportunity to, e.g., arrange for and rent one or more lead tracking machines that are usually provided to the exhibitor at the exhibition site and returned at the end of the exhibition.

The exhibitor enters 510 exhibitor information that may include but is not limited to identifying information such as name, address, telephone, facsimile, web site, e-mail and the like, as well as data items which may be summary or complete in content. With Internet or writeable CD-ROM access, for example, complete product literature, data sheets, catalogs and the like may be entered for retrieval at the exhibition.

Entering 510 information typically includes entering summary information or listings of products or services that will be the subject of visitor inquiry as well as answers to such inquiries. Exhibitor information 550 is an example of the kind of summary product information that a typical exhibitor such as AI Technology, Inc. of Princeton, N.J., might enter.

Preferably, exhibitor information is loaded or stored 520 on a portable medium that can easily be transported to the exhibition, such as a floppy disk or a CD-ROM. Suitable file formats may include word processor formats and spread sheet or database formats or other document formats (e.g., Word-Perfect, MS Word, Excel, Access, SQL, Adobe .pdf, etc.). At the exhibition, an exhibitor loads 520 the portable medium into the processor of an electronic gate or kiosk at its booth or station, and the information therein is then stored and available electronically through the processor thereof, for reproduction as needed and or for the writing of at least identifying information to the smart tags of visitors that visit that exhibitor's booth.

Where the station 10 includes a PDA device lead tracking machine 100 as illustrated in FIG. 3B, for example, the exhibitor (subscriber) accesses 500 the input "form" via a web site on the Internet and enters 510 exhibitor information via the Internet web site. In other words, the exhibitor registration and data entry is conducted "on line" via the Internet. Exhibitor information entered via the Internet or otherwise is stored 520, 530 in a portable medium which includes the memory of the PDA device, e.g., by an operator of the tracking system for an exhibition. Specifically, and preferably, exhibitor information entered via the Internet or otherwise is initially stored in a memory associated with a server or other computer and/or processor, typically running Microsoft ACCESS or SQL (sequential query language) relational database, from where it is transferred and stored 520, 530 in the portable medium, e.g., a PDA device memory. In registering, an exhibitor may specify the number of lead tracking machines 100 that he desires to receive for a particular exhibition.

One or more lead tracking machines 100 including a PDA device loaded 530 with the exhibitor information of a particular exhibitor is/are provided to that exhibitor who has registered as described. Each exhibitor receives one or more pre-loaded 530 PDA devices, typically at the exhibition site at or before commencement of the exhibition, although the PDA devices could be shipped to an exhibitor in advance. Additionally and/or alternatively, exhibitors may register 500 and/or enter exhibitor information 510 at an exhibition, and/or PDA stations may be provided to exhibitors before and/or during an exhibition, where provision is made therefor.

Reading 540 a visitor smart tag badge when a visitor comes to the exhibitor's booth and brings his smart tag sufficiently close to the lead tracking machine initiates greeting the visitor by name and enabling the visitor to review the exhibitor information stored in the processor of the lead tracking machine, e.g., using a touch screen. An initial screen display may include a welcome and questions soliciting information from the visitor. The initial or subsequent screens may provide 550 lists of products and/or services of the exhibitor in a form that the visitor by touching the appropriate portion of the touch screen can access additional information 560 via a branching/tree inquiry structure to reach the information desired. The visitor will also be able to click on various "buttons" on the displayed information screens to initiate requests for information and/or data items, either immediately or for future delivery. The visitor experience interacting with the lead tracking machine at each booth will be much like visiting a web-site with the addition that live personnel will be present to respond and samples of product and merchandise may be available for inspection and/or sale.

Figure 12:
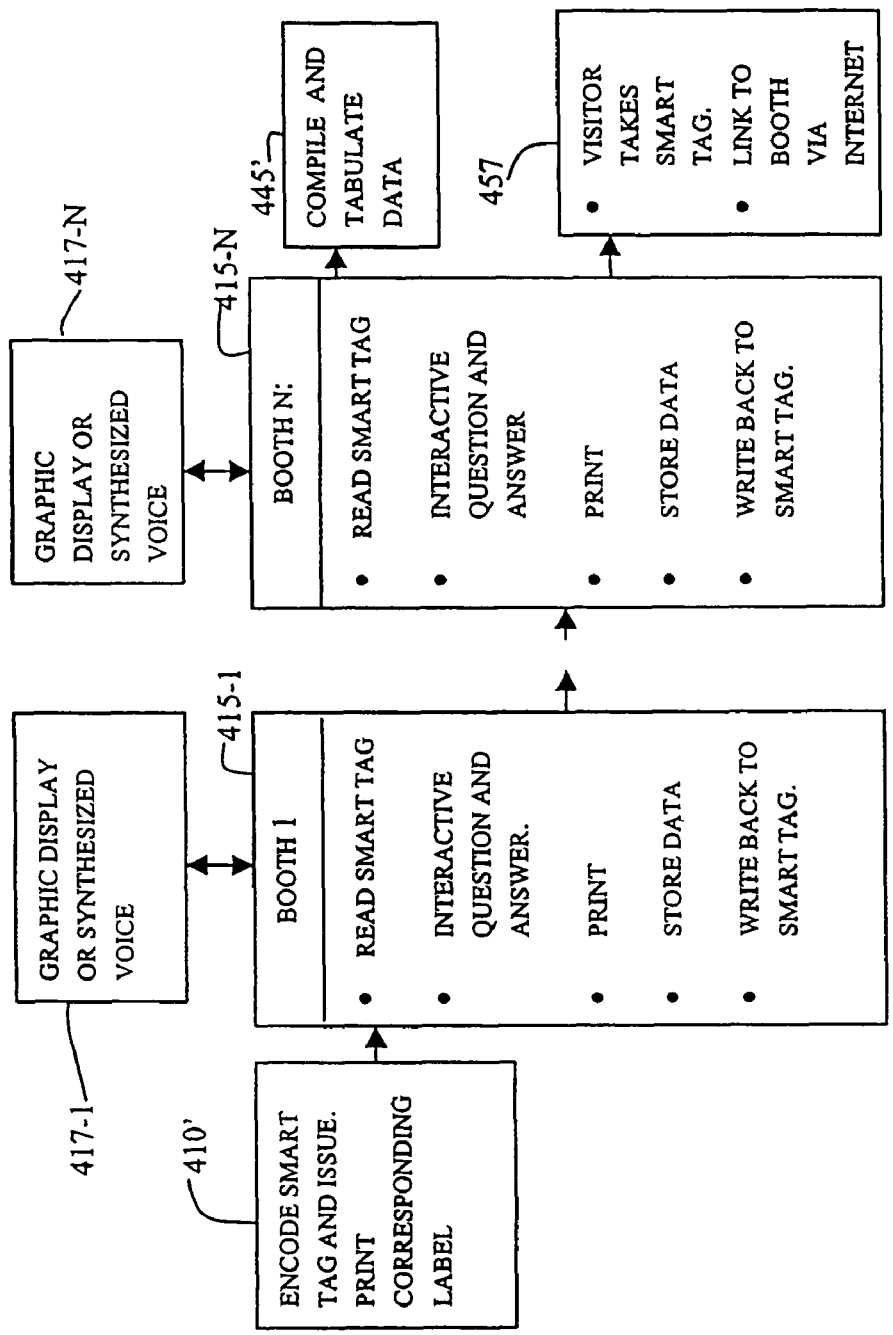

FIG. 12 is a schematic flow chart diagram illustrating an example of the method and operation of the present arrangement illustrating, in particular, utilization of the smart tag in performing a typical method, such as the method of FIG. 10. Encoding step 410' the smart tag with visitor and registration information comprises storing such information therein and printing a corresponding visitor label, either directly on the smart tag or on a label to be affixed or associated with the smart tag, and issuing the smart tag to the visitor.

The visitor takes the smart tag and begins to visit booths at the exhibition. At booth 1, step 415-1 comprises reading the smart tag, starting an optional interactive question/answer interchange with the visitor, printing information for the visitor, storing information relating to the visit, and writing visit information back to the visitor's smart tag. In response to read visitor information, a welcome or greeting is provided 417-1, such as by visual display or announcement such as by synthesized voice. Visit information such as exhibitor identity, booth identity, time and date of visit, data items requested and the like are stored. For example, visit information may be stored in a memory associated with either an electronic gate at the booth, a local processor or a central processor, or may be stored in the visitor's smart tag.

At booth 2 through booth N, i.e. all booths subsequently visited, the visitor's badge is similarly read 415-2-415-N and a greeting is provided 417-1-417-N in like manner to that of booth 1. Thereafter, information is processed such as by compilation and tabulation 445' either by being read from the visitors' smart tag badges or by communication from the memory in which it was stored to the processor. Processing 445' may pertain to any or all of individual visitors, all or a group of visitors, an exhibitor, all or a group of visitors, a given booth, all or a group of booths, a given day or other time period, or any other arrangement or organization of the information collected by the smart tags and/or the smart tag tracking system.

While the smart tag badges may be collected from visitors as they exit the exhibition, visitors may retain 457 their smart tags into which is encoded at the various booths or at check out with the web site addresses for the exhibitors so that the visitors can later link to those web sites for inquiry, curiosity, or obtaining further information. Alternatively, the visitor can exchange his smart tag badge and receive 457 a floppy disk onto which is stored the aforementioned information as well as any additional information desired, possibly including data items requested. In either case, reading at least the visitor, visit and exhibitor information stored in the visitor's smart tag provides the pointers to records in a relational database from which is retrieved the information that is stored on the badge or floppy disk that is taken 457 by the visitor.

Figure 13:
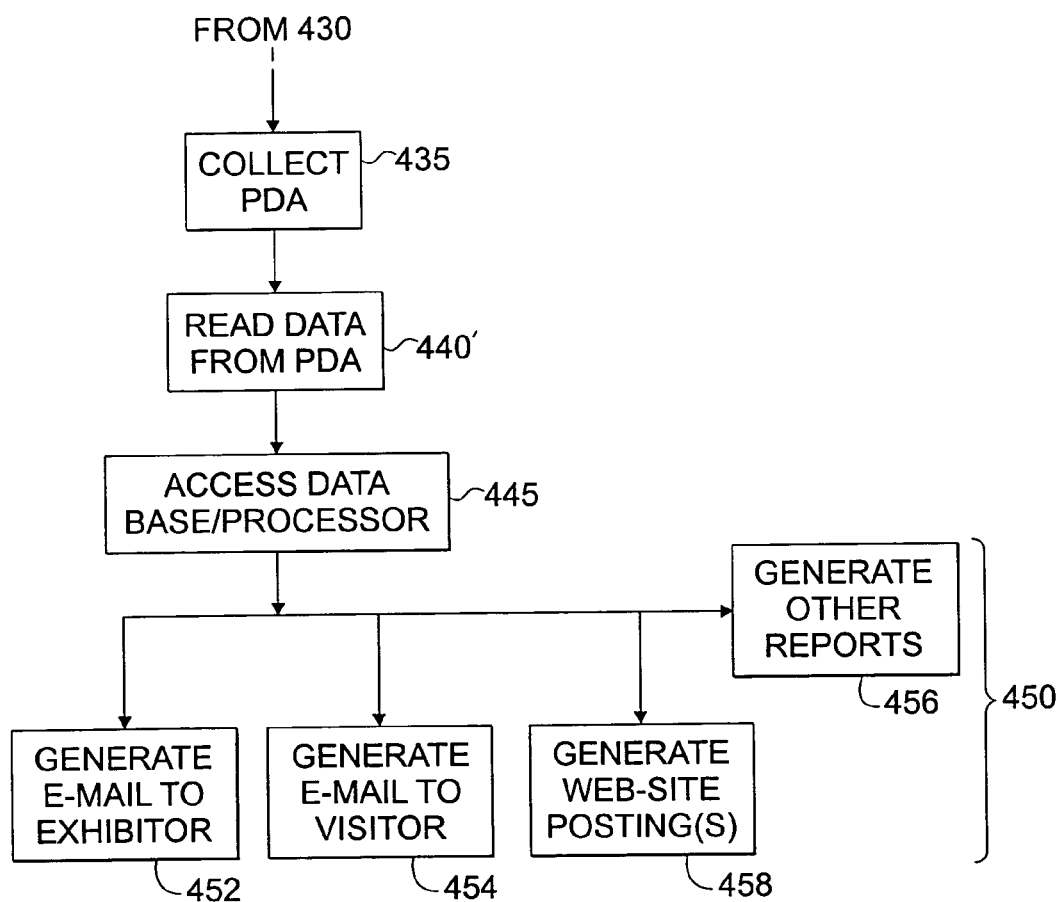
FIGS. 13 and 14 are schematic flow chart diagrams illustrating an example of various aspects of the method of FIGS. 9-12.

FIG. 13 is a schematic flow chart diagram illustrating an example of one aspect of the method of FIGS. 9-12, where the station 10 includes a PDA device lead tracking machine 100 as illustrated in FIG. 3B, for example. The exhibitor (subscriber) is provided a machine 100 for use at an exhibition wherein visitor information from visitor smart tags/badges is read by machine 100 and is stored in the memory thereof during the exhibition. At the conclusion of the exhibition and/or the exhibitor's use of the machine 100 during the exhibition, the machines including the PDA device are returned/collected 435 and the information stored therein, including exhibitor information and visitor information, is read 440' from the memory of the PDA device to a processor including the relational database containing visitor and exhibitor information provided by exhibitors and visitors in connection with their respective registrations.

Exhibitor information and visitor information read 440' from the memory of the PDA device is communicated 445 to a computer (processor) including a relational database in which is stored the visitor information provided by visitors in registering and the exhibitor information provided by exhibitors in registering. The database is accessed 445 for relating the visitor and exhibitor information stored therein for providing 450 various reports, e.g., to exhibitors 452, to visitors 454, to exhibition sponsors, managers, organizers and/or others 456, and/or to postings 458 on a web site accessible via the Internet. Reports may be provided at any time, however, exhibitor reports 452, visitor reports 454, and Internet web site postings 458 are typically provided after an exhibition concludes, whereas management reports, control reports and other reports may be provided 456 during the exhibition for the monitoring and/or managing thereof.

A report provided 452 to an exhibitor typically includes that exhibitor's identifying information and visitor information from the relational database for all visitors whose smart tag/badge was read by that exhibitor's PDA device lead tracking machine(s) and who is so identified by the related data read 440' from the PDA device. Where an exhibitor participates in a lecture, seminar and/or other event, and a smart tag machine is utilized for admitting people to that event, the exhibitor report may also include the attendees at such lecture, seminar and/or other event. In other words, each exhibitor report is customized to reflect those visitors who made a contact with the exhibitor and so may be a likely prospect for follow up. While such report may be provided in any desired form, as described, it is preferred that the exhibitor information include the exhibitor's e-mail address and that the exhibitor report be provided to the exhibitor via e-mail. Information in the report may be in any desired format, such as ASCII text, plain text, a comma-delimited text file, word processor format, portable document format (.pdf), and the like.

A report provided 454 to a visitor typically includes that visitor's identifying information and exhibitor information from the relational database for all exhibitors whose PDA device lead tracking machine read that visitor's smart tag/badge and which are so identified by the related data read 440' from the PDA device. Where a visitor participates in and/or attends a lecture, seminar and/or other event, and a smart tag machine is utilized for admitting people to that event, the visitor report may also include the exhibitors and/or presenters at such lecture, seminar and/or other event, and/or the content of any paper given or presentation made thereat. In other words, each visitor report is customized in accordance with that visitor's participation and visiting at the exhibition, and so includes those things that are presumably of interest to that visitor. While such report may be provided in any desired form, as described, it is preferred that the visitor information include the visitor's e-mail address and that the report be provided to the visitor via e-mail. Information in the report may be in any desired format, such as ASCII text, plain text, a comma-delimited text file, word processor format, portable document format (.pdf), and the like, and preferably includes URL addresses and/or links to the exhibitors' Internet web sites.

Other reports provided 456 to an exhibition manager, operator, sponsor and the like, may typically include visitor information, exhibitor information, as well as attendance, visitation patterns, and any other information that can be obtained from the relational database and/or that can be generated from the information contained in the relational database, both during the exhibition and after exhibitor PDA device lead tracking machines have been read. Where a lead tracking machine is in communication with the processor during the exhibition, either in real time or periodically, such other reports can be used for active monitoring and/or management. While such report may be provided in any desired form, as described, it is preferred that such reports be available on one or more displays in communication with the processor. Information in the report may be in any desired format, such as ASCII text, plain text, a comma-delimited file, word processor format, portable document format (.pdf), and the like, and/or may be graphically and/or pictorially presented.

Web site postings may be generated 458 prior to, during and/or after an exhibition, but are usually thought to be of more interest after an exhibition. For a given exhibition, the web site posting may include the exhibitor information provided by exhibitors in registering for the exhibition and/or additional information supplementing such information, e.g., as an exhibitor may determine from inquiries during an exhibition and/or from an exhibitor report provided 452. Access to information on the web site may utilize the relational database for relating exhibitors and exhibitor information, e.g., in the form of exhibitor web site addresses, URLs and/or links, as well a product, service and/or company information. Access to the web site may be open to any inquirer ("open access") and/or may be selective to registered visitors and/or exhibitors of a particular exhibition ("selective access"), as may be desired.

With open access, anyone may access the web site for the exhibition via the Internet and may engage in a "virtual" visit to the exhibition by navigating the web site, thereby to "visit" the exhibitor(s) and/or events contained on the web site that are of interest. Prior to the exhibition, the information available may be limited so as to serve as a marketing device to attract potential visitors to register for and/or attend the exhibition, and after the exhibition, more extensive information may be made available so as to maximize the usefulness to visitors, exhibitors and others.

With selective access, a registered visitor of a particular exhibition who accesses that exhibition's web site may be given access to information and/or features that are not available to persons not registered as a visitor. For example, only registered visitors may have access to the exhibition web site, or to certain parts thereof. By way of another example, a registered visitor may be provided a site map, index or other tool that is generated from the exhibitor and visitor information of the relational database representing his visit to the exhibition so that he may quickly and easily revisit the exhibitor booths that he visited at the exhibition via the web site, but not excluding the ability to visit booths not visited, thereby to have a "virtual" visit to the exhibition. In addition, registered visitors may be issued a log-in identifier and/or password, e.g., when they register and/or when they turn in their smart tag/badge.

It is noted that for any given exhibition web site, open access may be provided, selective access may be provided, or a combination of open and selective access may be provided. Where a web site hosts more than one exhibition, access for each exhibition may be different, e.g., with open access for one exhibition, selective access for another exhibition, and both open and selective access for yet another exhibition. Registered visitors may preview the exhibition and/or may revisit the exhibition to learn more about exhibitors that were contacted, i.e. those whose booth or station the visitor visited, and/or to "visit" the booths of exhibitors not actually visited during the exhibition. Web access for registered exhibitors and/or visitors may be without charge and/or limited in number of accesses, and/or for others may require registration with or without a charge. An example of such web site is available at a web site of Avante International Technology, Inc., Princeton Junction, N.J., e.g., www.leadretrievalsystem.com.

The visitor smart tags/badges may be made inexpensively, e.g., such as by simply laminating a smart tag electronic device and a simple wire loop antenna between a human-readable badge and a backing, e.g., a plastic or paper sheet to which the antenna and electronic device are adhered. Lamination may be by heat and/or adhesive, as desired. The badge and the backing may be of paper, plastic, and/or other suitable material. Smart tag/badges may be prepared (e.g., assembled and/or have visitor information stored therein) prior to the exhibition if visitors pre-register (e.g., by e-mail and/or via the Internet), and/or may be prepared at the exhibition for visitors who register on-site and/or in advance. Information encoded into the visitor smart tag/badge typically includes at least identifying information for relating to visitor information stored in the relational database, and may also include and/or may preferably include registration identifiers for events for which advance registration and/or payment is required. The smart tag/badge may be collected at the end of its being utilized at a particular exhibition and/or may be kept by the visitor, as desired.

Figure 14:
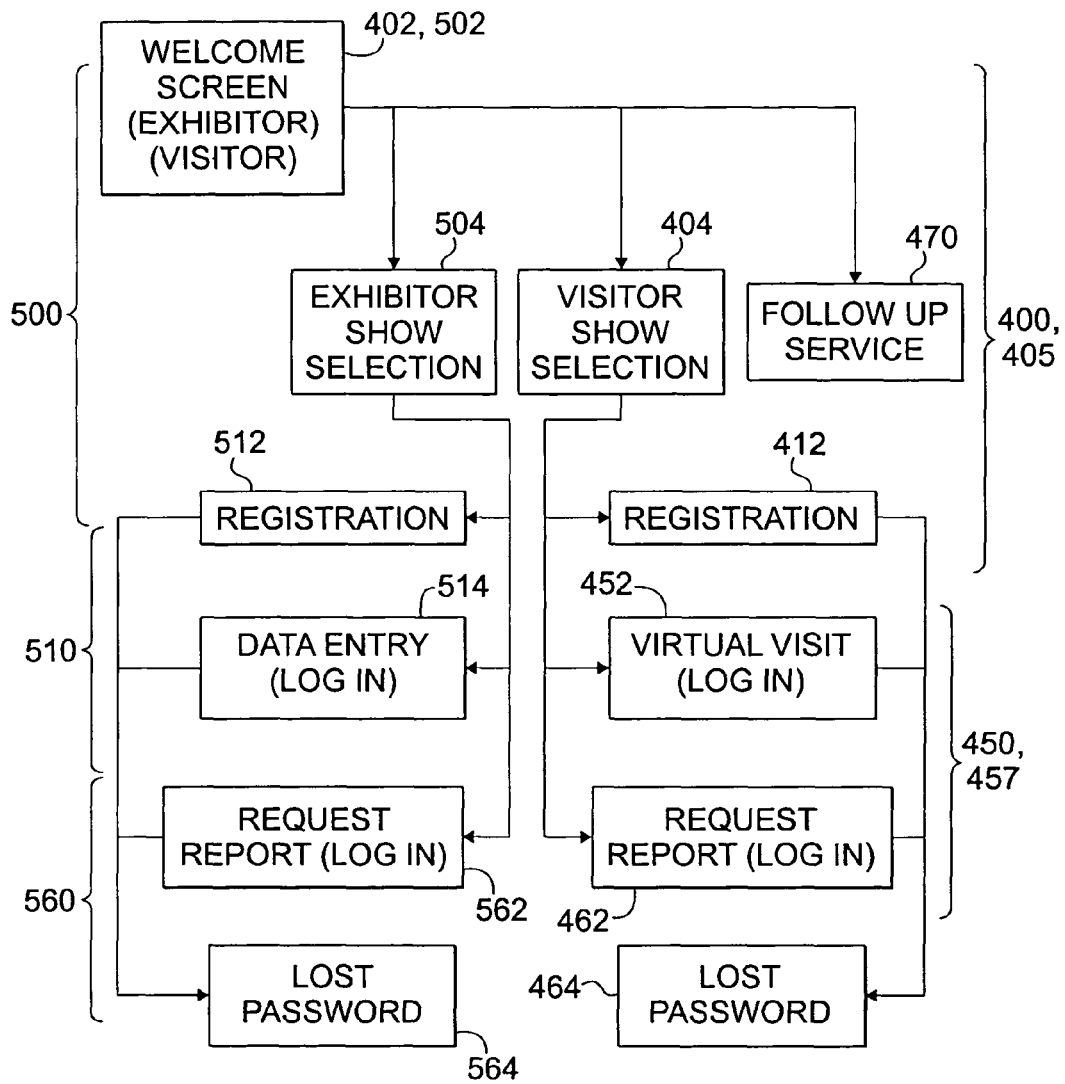

FIG. 14 is a schematic flow chart diagram illustrating an example of another aspect of the method of FIGS. 9-12. In particular, FIG. 14 illustrates the method by a sequence of web screens of an Internet web site for registering exhibitors 500, entering exhibitor data 510 and providing exhibitor reports 560, and/or for registering visitors 400, for providing virtual visits and/or for providing visitor reports 457. Upon logging on to the web site via the Internet, a welcome and log-on screen 402, 502 is presented. While a different welcome and log-on screen may be provided for visitors 402 and exhibitors 502, a common log-on screen 402, 502 may be, and preferably is, utilized wherein a "button" or region is provided for indicating whether the person is an exhibitor (present or future) or visitor (present or future). If the "Exhibitor" button is clicked (e.g., by placing a cursor or other indicia on the region and then pressing a button on a pointing device (mouse)), a sequence of screens for exhibitors follows, whereas if the "Visitor" button is clicked, a sequence of screens for visitors follows.

In an example embodiment, similar show selections 504, 404 are provided for exhibitors and visitors, although the indication of exhibitor or visitor is retained for directing access to subsequent different screens. Selections (buttons and/or links) available on such show selection screens 404, 504 may include, for example, listings of current, future and/or prior shows/exhibitions with buttons/links for selecting any thereof and/or with buttons/links to a web site maintained by or for such show/exhibition. In addition, a search feature may be provided whereby one may search for shows/exhibitions by various criteria, including, but not limited to, date, month and year, category, technology, location and the like.

If the button for exhibitor is selected on any screen, the choices presented to a present (registered) or potential future exhibitor may include, for example, to register 512 as an exhibitor for the show/exhibition selected including to reserve and/or rent a tracking machine for the selected show/exhibition, to enter 514 and/or amend 514 previously entered exhibitor information, and/or to request another report, e.g., an e-mail report, of the leads gathered from the selected past exhibition. At some point in the preceding sequence, the exhibitor is requested to enter a confirmation number or other identifier and/or a password in order to access the particular feature, function and/or service. In registering, the exhibitor may be permitted to specify his own user name, identifier and/or password, and/or may be assigned a user name, identifier and/or password, to be utilized for future access to the web site for the particular show (exhibition) being registered for.

For exhibitor registration, exhibitor information to be entered may include some or all of name, title, company name, personal and/or company address, personal and/or company telephone and/or facsimile numbers, personal and/or company e-mail address, company Internet address and/or web site URL, numbers and/or types of leads tracking apparatus desired, show/exhibition identification and booth information (e.g., booth number and location), exhibitor representative(s) name(s) and contact information, products and/or services, specification of the tracking equipment and web page postings desired, and/or desired actions that may be taken regarding a visitor (e.g., follow up assistance, personal contact, provide samples, call for business terms, requests for literature/brochures for products and/or services, and the like). Each exhibitor will also provide personal and/or company credit card and/or other payment information, e.g., for the fee for registering, for renting tracking equipment and/or for utilizing the web page posting service, obtaining reports and specialized and/or customized reports, and the like.

If the button for visitor is selected on any screen, the choices presented to a present (registered) or potential future visitor may include, for example, to register 412 as a visitor for a show/exhibition, to register for a virtual visit 452 to a present show, a future show, and/or a past show not attended, to register for a virtual visit 452 (replication) of a past show attended as a registered visitor, and/or to request another and/or an additional report 462, e.g., an e-mail report, of the visitor report from the selected past exhibition. At some point in the preceding sequence, the visitor is requested to enter a confirmation number or other identifier and/or a password in order to access the particular feature, function and/or service.

For visitor registration, visitor information to be entered may include some or all of name, title, company name, personal and/or company address, telephone and/or facsimile numbers, e-mail address, credit card and/or other payment information if there is a fee for registering, show/exhibition identification, particular event registrations, and the like. In registering, the visitor may be permitted to specify his own user name or other identifier and password, and/or may be assigned a user name, identifier and/or password, to be utilized for future access to the web site for the particular show (exhibition) being registered for.

The virtual visit screen 452 is the entry to the web pages for the selected exhibition, which may include a customized set of web pages and/or screens selected based upon the records in the relational database of visits to booths/stations by that visitor's smart tag/badge during the selected exhibition, and/or may include the web pages and/or screens for all exhibitors, or at least for all exhibitors who register for listing on the exhibition web site. The virtual visit screen 452 for an unregistered person may provide access to the web pages for the particular exhibition and/or may require registration 412 (with or without charge) therefor.

Request report screens 462, 562 (and, optionally, other screens) require entry of the user name or identifier and password selected by or assigned to the exhibitor or visitor at registration in order to initiate the sending of an exhibitor or visitor report by e-mail, and such report is generated by relating visitor and exhibitor information stored in the relational database for the particular exhibition, as described.

Preferably, the communication with the web site via the Internet is conducted with encryption for security and protection of exhibitor and visitor information, such as credit card or other payment information. Suitable encryption includes the MD5 128-bit encryption algorithm conventionally utilized for Internet and other e-commerce transactions, e.g., utilizing MD5 encryption alone or in combination with other encryption, preferably other 128-bit or greater encryption.

Buttons and/or links may also be provided, e.g., on the welcome screen 402, 502 and/or other screens, for accessing descriptive information and/or instructions, and the like. For example, a button for "Follow Up Service" 470 may be provided on welcome screens 404, 504 or any other screen to present a screen describing a follow up service 470 and/or providing instructions as to how to access and/or utilize such service. The same screen may be provided 470 to exhibitors and visitors, and may include buttons for moving directly to other screens, such as buttons to indicate a person is an "Exhibitor" or a "Visitor" and/or to return to a home screen, a welcome screen and/or a log-in screen. In addition a button and/or link may be provided to access descriptive information, e.g., information relating to the lead tracking system and how it operates, the features thereof, and/or other information that might be of interest to an exhibitor and/or visitor.

At one or more of the screens where an identifier and password is required to be submitted, provision is preferably made to accommodate exhibitors and/or visitors who may not remember or have available their chosen and/or assigned identifier and/or password. Lost password function 464, 564 is responsive to the clicking of a Lost Password button to present a screen wherein the registered exhibitor or visitor may enter his e-mail address. If the e-mail address of the exhibitor/visitor entered on the Lost Password screen regarding a particular show/exhibition corresponds to (i.e. matches) the e-mail address provided by the exhibitor as exhibitor information or by the visitor as visitor information in registering for that particular show/exhibition, then that registered exhibitor's/visitor's password will be sent to the registered e-mail address. The matching of e-mail addresses for a lost exhibitor/visitor password utilizes the exhibitor information and/or visitor information stored in the relational database for the particular show/exhibition, and the password stored therein corresponding to the exhibitor's/visitor's e-mail address is provided.

It is understood that the ordering and/or composition of screens presented to a visitor and/or exhibitor may be different from the example described above without departing from the scope and spirit of the present invention. For example, the selection of a show or exhibition 404, 504 may precede or follow the indicating of exhibitor or visitor 402, 502, and/or common screens may be utilized for both visitors and exhibitors, e.g., in selecting a show/exhibition 404, 504, registering 412, 512, requesting a report 462, 562, reporting a lost password 464, 564, and the like, although the identity and/or status of the exhibitor/visitor may be maintained for presenting subsequent information.

By way of further example, registration of visitors and/or exhibitors may be provided on-site at a show or exhibition by terminals operating as described above. Such on-site terminals are in communication with the server via the Internet and/or other network or communication path, and/or with a local computer including the database and registration software. Visitors and/or exhibitors may register themselves, and/or personnel of the exhibition may operate the terminals for registering visitors and/or exhibitors.

In like manner, where exhibitor information is stored in the visitor smart tag by the smart tag reader/writer of the stations (booths) visited, read out stations and/or kiosks may be utilized for visitor check out. At visitor check out, the information stored in the visitor smart tag is read by the read out station and/or kiosk for generating and providing a report at the time of check out, e.g., by providing a printed or other tangible report to the visitor, and/or an electronic report by e-mail to the visitor's registered e-mail address. In addition, such stations and/or kiosks may be present at the exhibition, e.g., at various locations in the exhibition area, for visitors to have their smart tags read at any convenient time and to receive a printed report thereof at that time. Such stations/kiosks are described above.

While registration of visitors 412 and exhibitors 512 usually requires a payment of a fee (e.g., an admission or entrance fee, an event fee, an activity fee, an exhibitor booth rental fee, a tracking station rental fee, a web-site usage fee, and the like), with registration 412, 512 as described via a terminal in communication with a computer on which is a relational database for storing visitor and exhibitor information, exhibitors, exhibit sponsors and others may by prearrangement obtain one or more codes representing "free passes" for admission and/or events. Such pass codes may then be provided to customers, associates and others as complementary electronic admission tickets that can be entered via the registration screens 412, 512 as described in registering. Payment for such pass codes may be by advance payment and/or for payment upon use for registering, as desired. Pass codes may be utilized for actual admission and/or for admission to the virtual visit 452.

Registered visitors and/or registered exhibitors are typically provided a pass code that allows access to the web site(s) providing a virtual visit 452 to the show(s) and exhibition(s) for which they have registered. Typically, the pass code is valid for a predetermined period of time following a show or exhibition and is provided without additional charge to registered visitors and/or registered exhibitors.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

While various antenna array arrangements may be utilized with the present arrangement, examples of suitable antenna arrays are described in detail in Applicant's co-pending U.S. patent application Ser. No. 09/854,722 entitled "Antenna Array for Smart RFID Tags" filed on May 14, 2001, and Ser. No. 10/246,990 entitled "Antenna Arrangement for RFID Smart Tags" filed on Sep. 19, 2002, which Applications are hereby incorporated herein in their entirety.

While the present invention has been described in terms of the foregoing exemplary embodiments, variations within the scope and spirit of the present invention as defined by the claims following will be apparent to those skilled in the art. For example, many different combinations and/or arrangements of antenna, antenna arrays, control units, smart tag reader/writers, communication devices and processors may be employed in making and using the system and in practicing the method described.

Further, the terms "visit," "visited" and "visiting" are used herein (e.g., regarding a booth, station, event and/or other activity) to indicate that a smart tag (e.g., a smart tag issued to a visitor or attendee or other person) has communicated with a smart tag reader and/or writer (e.g., a smart tag reader and/or writer associated with a station, booth, electronic gate, PDA device or other location and/or apparatus).

While the present system, apparatus and method has been described utilizing a smart tag, which is the preferred embodiment and which provides certain advantages, at least certain aspects of the arrangements described may be employed with other encoded tags. Other encoded tags may include, for example, a magnetic stripe card/tag and/or a bar-code card/tag (e.g., either a one-dimensional or two-dimensional bar code), notwithstanding the limitations thereof as set forth above. In such arrangement, the reader 170, 170', RW-1-RW-n, of each station may be an appropriate sensor, such as a magnetic stripe reader and/or a bar-code reader, as appropriate. In such arrangement, the information stored in the encoded card/tag may be in a more highly encoded format or may be reduced to compensate, at least in part, for the limited memory capacity of the magnetic stripe encoded card/tag and/or a bar-code encoded card/tag.

While only one processor (computer) is necessary to the present arrangement, it is often convenient to employ a plural processors which are or may be linked, as by a network, for example, to a central processor. Typically, each local processor is associated with one or more stations for monitoring and/or communicating information with such station(s), and is linked with the central processor for communicating monitoring information therewith. Thus, stations may operate independently, under the control of a local computer, under control of a central computer, or some combination thereof.

Any convenient communication protocol, such as the RS-485 or RS-232, may be employed. The selection of wired and/or wireless communication among various stations of a tracking system typically will depend on the location and proximity of the various stations and the relative ease of providing wire, cable or optical fiber as compared to wireless radio frequency or optical communication.

Communication among stations, PDA devices and/or processors may occur periodically, but promptly (e.g., within seconds) relative to the speed at which new visit information, for example, is recorded, and the timeliness of tracking and monitoring desired. Periodic communication may be beneficial for wireless communication to reduce frequency spectrum and bandwidth requirements in a confined exhibition space. On the other hand, communication at irregular and/or widely separated times is also suitable, e.g., where PDA devices are provided before or near in time to the beginning of an exhibition/show and are not collected and/or read until near to or after the conclusion thereof.

Exhibitor smart tags that are different from smart tags issued to visitors may be provided so that exhibitors at a booth can monitor information relating to that booth and visits thereto. Exhibitor smart tags may be different in form from visitor smart tags but need not be. Exhibitor smart tags are different in function in that they are at least differently coded so that smart tag electronic gates at a booth, as well as at a check out station differentiate them from visitor smart tags, for example, to enable access to certain stored information and/or reports intended for the particular or all exhibitors.

Information stored in the relational data base of processor, whether central or local, as well as in memory associated with an electronic gate, may be stored on plural storage media for redundancy. Typically, the relational data base is maintained on a computer hard drive, and may be duplicated on another hard drive of the same or a different processor, or on a different media such as non-volatile memory cards or modules, magnetic tape, floppy disk, CD-ROM, optical disk, and the like. Any or all of the foregoing may be referred to as a memory or as an electronic memory.

What is claimed is:

1. A method for conducting an exhibition wherein a visitor having an encoded tag visits a plurality of stations each including an encoded tag reader, the method comprising:

registering a visitor including storing in a database visitor information entered on a registration screen accessed via the Internet;

issuing a visitor tag containing visitor information, the visitor tag providing at least visitor information in an encoded tag format;

registering exhibitors including storing in a database exhibitor information entered on a registration screen accessed via the Internet;

storing exhibitor information of a registered exhibitor in a memory of one of a number of respective PDA devices, wherein each respective PDA device has an encoded tag reader associated therewith for receiving information in the encoded tag format;

whereby information can be communicated between the visitor tag and the PDA device when the visitor tag is proximate the PDA device, providing the respective PDA devices, wherein each PDA device includes stored exhibitor information of a respective registered exhibitor;

communicating information between the visitor tag and a particular PDA device when the visitor tag is proximate the particular PDA device, wherein visitor information from the visitor tag is stored in a memory associated with the particular PDA device;

collecting visitor information and exhibitor information from ones of the respective PDA devices after one or more visitor tags have communicated with a respective station;

processing the visitor information and exhibitor information collected from ones of the respective PDA devices in relation to visitor information and/or exhibitor information stored in the database; and providing a report including processed exhibitor information representative of stations that communicated with a visitor tag and/or providing a report including processed visitor information representative of visitor tags that communicated with a respective station.

2. The method of claim 1 wherein said registering a visitor and/or said registering exhibitors is performed prior to an exhibition and/or during an exhibition.

3. The method of claim 1:
wherein said providing a report including processed exhibitor information includes providing the report to a registered visitor, and/or
wherein said providing a report including processed visitor information includes providing the report to a registered exhibitor.

4. The method of claim 3:
wherein said providing the report to a registered visitor includes sending the report to an e-mail address included in the visitor information for that registered visitor stored in said registering a visitor, and/or
wherein said providing the report to a registered exhibitor includes sending the report to an e-mail address included in the exhibitor information for that registered exhibitor stored in said registering an exhibitor.

5. The method of claim 4 wherein the report e-mailed to a registered visitor includes an e-mail address, an Internet address, a URL, and/or a link to an Internet web site included in the exhibitor information of the database.

6. The method of claim 5 wherein the e-mail address, Internet address, URL, and/or link to an Internet web site included in the exhibitor information of the database corresponds to one or more exhibitors that communicated with the visitor smart tag issued for the registered visitor.

7. The method of claim 1 wherein said providing a report including processed exhibitor information and/or providing a report including processed visitor information includes providing an electronic file, a floppy disk, an optical disk, an electronic medium, a CD-ROM disk, and/or a report via the Internet.

8. The method of claim 1 further comprising providing a report including processed exhibitor information representative of stations that communicated with visitor tags and/or processed visitor information representative of visitor tags that communicated with respective stations.

9. The method of claim 1 wherein said registering a visitor and/or said registering exhibitors includes providing a selection screen for selecting an exhibition from a number of exhibitions and registering for the selected exhibition via a registration screen accessed via the Internet.

10. The method of claim 1 wherein said communicating information includes wherein exhibitor information from the particular PDA device is stored in a memory associated with the visitor tag, said method further comprising:
processing the visitor information and exhibitor information collected from ones of the respective visitor tags in relation to visitor information and/or exhibitor information stored in the database; and
providing a report including processed exhibitor information representative of stations that communicated with a visitor tag and/or providing a report including processed visitor information representative of visitor tags that communicated with a respective station.

11. The method of claim 1:
wherein a registered e-mail address and a password are included in the visitor information stored in said registering a visitor, wherein said providing a report is responsive to receiving an e-mail address and/or password that corresponds to the registered e-mail address and/or password included in the stored visitor information in the database for sending the report to the registered e-mail address; and/or
wherein a registered e-mail address and a password are included in the exhibitor information stored in said registering an exhibitor, wherein said providing a report is responsive to receiving an e-mail address and/or password that corresponds to the registered e-mail address and/or password included in the stored exhibitor information in the database for sending the report to the registered e-mail address.

12. The method of claim 1 wherein a registered e-mail address and a password are included in the visitor information stored in said registering a visitor, and/or wherein a registered e-mail address and a password are included in the exhibitor information stored in said registering an exhibitor, said method further comprising:
providing the password included in the stored visitor information for a registered visitor via e-mail, wherein said providing the password is responsive to receiving an e-mail address that corresponds to the registered e-mail address included in the stored visitor information in the database for sending the password to the registered e-mail address; and/or
providing the password included in the stored exhibitor information for a registered exhibitor via e-mail, wherein said providing the password is responsive to receiving an e-mail address that corresponds to the registered e-mail address included in the stored exhibitor information in the database for sending the password to the registered e-mail address.

13. The method of claim 1 wherein said issuing a visitor tag includes one or more of:
issuing a human-readable badge associated with the visitor tag;
issuing a visitor smart tag including an electronic memory having visitor information stored therein;
issuing a visitor tag including a magnetic stripe memory having visitor information stored therein; and
issuing a visitor tag having visitor information stored in a bar code.

14. A method for conducting an exhibition wherein a visitor having an encoded tag visits a plurality of stations each including an encoded tag reader, the method comprising:
registering a visitor including storing in a database visitor information entered on a registration screen accessed via the Internet;
issuing a visitor tag containing visitor information, the visitor tag providing at least visitor information in an encoded tag format;
registering exhibitors including storing in a database exhibitor information entered on a registration screen accessed via the Internet;
storing exhibitor information of a registered exhibitor in a memory of one of a number of respective PDA devices, wherein each respective PDA device has an encoded tag reader associated therewith for receiving information in the encoded tag format;
whereby information can be communicated between the visitor smart tag and the PDA device when the visitor tag is proximate the PDA device,
providing the respective PDA devices, wherein each PDA device includes stored exhibitor information of a respective registered exhibitor;

communicating information between the visitor tag and a particular PDA device when the visitor tag is proximate the particular PDA device, wherein visitor information from the visitor tag is stored in a memory associated with the particular PDA device and/or wherein exhibitor information from the particular PDA device is stored in a memory associated with the visitor tag;

collecting visitor information and exhibitor information from ones of the respective PDA devices and/or visitor tags after one or more visitor tags have communicated with a respective station;

processing the visitor information and exhibitor information collected from ones of the respective PDA devices and/or visitor tags in relation to visitor information and/or exhibitor information stored in the database; and providing a report including processed exhibitor information representative of stations that communicated with a visitor tag and/or providing a report including processed visitor information representative of visitor tags that communicated with a respective station.

15. The method of claim 14:

wherein said providing a report is to a registered visitor and includes sending the report to an e-mail address included in the visitor information for that registered visitor stored in said registering a visitor, and/or wherein said providing a report is to a registered exhibitor and includes sending the report to an e-mail address included in the exhibitor information for that registered exhibitor stored in said registering an exhibitor.

16. The method of claim 15 wherein said providing a report to a registered visitor is responsive to reading visitor information and exhibitor information stored in the memory associated with a visitor tag.

17. The method of claim 15 wherein the report e-mailed to a registered visitor includes an e-mail address, an Internet address, a URL, and/or a link to an Internet web site included in the exhibitor information of the database.

18. The method of claim 17 wherein the e-mail address, Internet address, URL, and/or link to an Internet web site included in the exhibitor information of the database corresponds to one or more exhibitors whose PDA device communicated with the visitor smart tag issued for the registered visitor.

19. The method of claim 14 wherein said issuing a visitor tag includes one or more of:

issuing a human-readable badge associated with the visitor tag;

issuing a visitor smart tag including an electronic memory having visitor information stored therein;

issuing a visitor tag including a magnetic stripe memory having visitor information stored therein; and issuing a visitor tag having visitor information stored in a bar code.

20. A storage medium encoded with machine-readable computer instructions for tracking wherein a visitor having an encoded visitor tag visits a plurality of stations each including an encoded tag reader, comprising:

means for causing a computer to register a visitor including storing in a database visitor information entered on a registration screen;

means for causing the computer to store visitor information in a visitor tag in an encoded tag format;

means for causing the computer to register exhibitors including storing in a database exhibitor information entered on a registration screen;

means for causing the computer to store exhibitor information of a registered exhibitor in a PDA device operable with an encoded tag reader;

whereby information can be communicated between the visitor tag and the PDA device when the visitor tag is proximate the encoded tag reader of the PDA device;

means for causing the computer to store visitor information and exhibitor information from the PDA device after one or more visitor tags have communicated therewith;

means for causing the computer to process the stored visitor information and exhibitor information from the PDA device in relation to visitor information and/or exhibitor information stored in the database; and means for causing the computer to provide a report including processed visitor information representative of one or more visitor tags that communicated with the PDA device.

21. The storage medium of claim 20 wherein said means for causing the computer to provide a report including processed visitor information includes means for causing the computer to provide the report to a registered exhibitor by sending the report to an e-mail address included in the exhibitor information for that registered exhibitor.

22. The storage medium of claim 20 wherein said means for causing the computer to store exhibitor information causes the computer to store exhibitor information of a plurality of registered exhibitors in a plurality of PDA devices operable with an encoded tag reader, said storage medium further comprising:

means for causing the computer to provide a report including processed exhibitor information representative of one or more PDA devices that communicated with a visitor tag.

23. The storage medium of claim 22 wherein said means for causing the computer to provide a report including processed exhibitor information includes means for causing the computer to provide the report to a registered visitor by sending the report to an e-mail address included in the visitor information for that registered visitor.

24. The storage medium of claim 20 wherein said means for causing the computer to store exhibitor information causes the computer to store exhibitor information of a plurality of registered exhibitors in a plurality of PDA devices operable with an encoded tag reader, said storage medium further comprising:

means for causing the computer to store visitor information and exhibitor information from the visitor tag after one or more PDA devices have communicated therewith;

means for causing the computer to process the stored visitor information and exhibitor information from the visitor tag in relation to visitor information and/or exhibitor information stored in the database; and means for causing the computer to provide a report including processed exhibitor information representative of one or more PDA devices that communicated with a visitor tag.

25. The storage medium of claim 24 wherein said means for causing the computer to provide a report including processed exhibitor information includes means for causing the computer to provide the report to a registered visitor by sending the report to an e-mail address included in the visitor information for that registered visitor.

26. The storage medium of claim 20 wherein the visitor information and the exhibitor information each include a registered e-mail address and a registered password, said storage medium further comprising:

means for causing the computer to provide the registered password to the registered e-mail address in response to receiving an e-mail address that corresponds to the registered e-mail address; and/or means for causing the computer to provide a report including processed visitor information and/or processed exhibitor information to the registered e-mail address in response to receiving a password that corresponds to the registered password.

27. The storage medium of claim 26 wherein said means for causing the computer to provide a report includes means for causing the computer to generate a report including a registered e-mail address, an Internet address, a URL, and/or a link to an Internet web site included in the exhibitor information and/or the visitor information.

28. The storage medium of claim 20 wherein the visitor tag includes one or more of:

a human-readable badge associated with the encoded tag;

a smart tag including an electronic memory having visitor information stored therein;

an encoded tag including a magnetic stripe memory having visitor information stored therein; and an encoded tag having visitor information stored in a bar code.

\* \* \* \* \*